(12) United States Patent
Mars et al.

(10) Patent No.: US 11,546,728 B2
(45) Date of Patent: Jan. 3, 2023

(54) METHODS AND APPARATUS FOR PRESENCE SENSING REPORTING

(71) Applicant: Proxy, Inc., San Francisco, CA (US)

(72) Inventors: Denis Mars, San Francisco, CA (US); Simon Ratner, San Francisco, CA (US)

(73) Assignee: Proxy, Inc., Redwood City, CA (US)

( * ) Notice: Subject to any disclaimer, the term of this patent is extended or adjusted under 35 U.S.C. 154(b) by 0 days.

(21) Appl. No.: 17/098,246

(22) Filed: Nov. 13, 2020

(65) Prior Publication Data
US 2021/0160658 A1 May 27, 2021

Related U.S. Application Data

(63) Continuation-in-part of application No. 16/573,806, filed on Sep. 17, 2019, which is a continuation-in-part
(Continued)

(51) Int. Cl.
*H04W 4/02* (2018.01)
*H04W 4/024* (2018.01)
(Continued)

(52) U.S. Cl.
CPC ......... *H04W 4/024* (2018.02); *H04L 63/0876* (2013.01); *H04L 67/12* (2013.01); *H04W 4/20* (2013.01)

(58) Field of Classification Search
CPC .. G06Q 20/306; G06Q 20/308; G06Q 20/321; G06Q 20/326; G06Q 20/40145;
(Continued)

(56) References Cited

U.S. PATENT DOCUMENTS 6,323,846 B1 11/2001 Westerman et al.
6,570,557 B1 5/2003 Westerman et al.
(Continued)

FOREIGN PATENT DOCUMENTS

CN 1513159 A 7/2004
CN 102461128 A 5/2012
(Continued)

OTHER PUBLICATIONS

Michael Grabatin et al., "Reliability and scalability Improvements to Identity Federations by managing SAML Metadata with Distributed Ledger Technology", NOMS 2018—2018 IEEE/IFIP Network Operations and Management Symposium, pp. 1-6, Taipei, Taiwan.
(Continued)

*Primary Examiner* — Nader Bolourchi

(57) ABSTRACT

A system includes sensors disposed within a location for outputting presence signals to a smart device, for receiving an ephemeral ID signal from the smart device, for outputting sensor ID signals to the smart device, for receiving responsive data from the smart device and for determining presence of the smart device in response to the responsive data, an authentication server for receiving the sensor ID signals from the smart device, for determining the responsive data, and for providing the responsive data to the smart device, a hub device coupled to the sensors for receiving an indication of the determination of the presence of the smart device, for determining additional data associated with the smart device, for facilitating a physical change perceptible to a user of the smart device in response to the additional data, and for providing the presence data to a smart device associated with a first responder.

20 Claims, 18 Drawing Sheets

Related U.S. Application Data of application No. PCT/US2019/037553, filed on Jun. 17, 2019.

(60) Provisional application No. 62/935,000, filed on Nov. 13, 2019, provisional application No. 62/789,063, filed on Jan. 7, 2019, provisional application No. 62/685,292, filed on Jun. 15, 2018.

(51) Int. Cl.
*H04W 4/20* (2018.01)
*H04L 67/12* (2022.01)
*H04L 9/40* (2022.01)

(58) Field of Classification Search
CPC . H04B 10/1141; H04L 63/0876; H04L 67/12; H04L 67/125; H04L 9/0894; H04L 9/3213; H04L 9/3234; H04W 12/02; H04W 12/06; H04W 4/024; H04W 4/20; H04W 4/80
See application file for complete search history.

(56) References Cited

U.S. PATENT DOCUMENTS

| | | |
|---|---|---|
| 6,647,497 B1 | 11/2003 | Cromer et al. |
| 6,677,932 B1 | 1/2004 | Westerman |
| 7,096,363 B2 | 8/2006 | Kon et al. |
| 7,382,253 B2 | 6/2008 | Oliveras |
| 7,606,560 B2 | 10/2009 | Labrou et al. |
| 7,937,447 B1 | 5/2011 | Cohen et al. |
| 8,181,867 B1 | 5/2012 | Bierbaum et al. |
| 8,347,720 B2 | 1/2013 | De Los Santos et al. |
| 8,495,720 B2 | 7/2013 | Counterman |
| 8,522,596 B2 | 9/2013 | Avery |
| 8,542,189 B2 | 9/2013 | Milne et al. |
| 8,544,326 B2 | 10/2013 | Je |
| 9,043,602 B1 | 5/2015 | Krieger et al. |
| 9,635,000 B1 | 4/2017 | Muftic |
| 9,883,388 B2 | 1/2018 | Kim et al. |
| 10,125,519 B1 | 11/2018 | Gengler et al. |
| 10,880,298 B2 | 12/2020 | Chabanne et al. |
| 2002/0015024 A1 | 2/2002 | Westerman et al. |
| 2002/0031230 A1 | 3/2002 | Sweet et al. |
| 2002/0059639 A1 | 5/2002 | Thornton et al. |
| 2002/0131445 A1 | 9/2002 | Skubic et al. |
| 2004/0073795 A1 | 4/2004 | Jablon |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0053387 A1 | 3/2006 | Ording |
| 2006/0065730 A1 | 3/2006 | Quan et al. |
| 2006/0081695 A1 | 4/2006 | Jung et al. |
| 2006/0085757 A1 | 4/2006 | Andre et al. |
| 2006/0097991 A1 | 5/2006 | Hotelling et al. |
| 2006/0157563 A1 | 7/2006 | Marshall |
| 2006/0161870 A1 | 7/2006 | Hotelling et al. |
| 2006/0161871 A1 | 7/2006 | Hotelling et al. |
| 2006/0197753 A1 | 9/2006 | Hotelling |
| 2006/0206246 A1 | 9/2006 | Walker |
| 2007/0075965 A1 | 4/2007 | Huppi et al. |
| 2007/0155370 A1 | 7/2007 | Daigle |
| 2007/0257890 A1 | 11/2007 | Hotelling et al. |
| 2008/0006695 A1 | 1/2008 | Morita |
| 2008/0028206 A1 | 1/2008 | Sicard et al. |
| 2008/0140868 A1 | 6/2008 | Kalayjian et al. |
| 2008/0141356 A1 | 6/2008 | Giles et al. |
| 2008/0141357 A1 | 6/2008 | Deligne et al. |
| 2008/0155019 A1 | 6/2008 | Wallace et al. |
| 2008/0314971 A1 | 12/2008 | Faith et al. |
| 2009/0025435 A1 | 1/2009 | Popowski |
| 2009/0204348 A1 | 8/2009 | Davis et al. |
| 2009/0240625 A1 | 9/2009 | Faith |
| 2009/0287930 A1 | 11/2009 | Nagaraja |
| 2009/0305219 A1 | 12/2009 | Stuempfle |
| 2010/0089995 A1 | 4/2010 | El-Awady |
| 2010/0242102 A1 | 9/2010 | Cross et al. |
| 2011/0199308 A1 | 8/2011 | Nativel |
| 2011/0201381 A1 | 8/2011 | Herz et al. |
| 2011/0277025 A1* | 11/2011 | Counterman ......... H04L 9/3226 726/8 |
| 2011/0300802 A1 | 12/2011 | Proctor, Jr. et al. |
| 2011/0302014 A1 | 12/2011 | Proctor, Jr. et al. |
| 2012/0185697 A1 | 7/2012 | Buer |
| 2013/0043982 A1 | 2/2013 | Robshaw et al. |
| 2013/0111580 A1 | 5/2013 | Checco |
| 2013/0117078 A1 | 5/2013 | Weik, III et al. |
| 2013/0133087 A1 | 5/2013 | Proctor, Jr. et al. |
| 2013/0185358 A1 | 7/2013 | Lu et al. |
| 2014/0002236 A1 | 1/2014 | Pineau et al. |
| 2014/0003681 A1 | 1/2014 | Wright et al. |
| 2014/0013108 A1 | 1/2014 | Pellikka et al. |
| 2014/0025753 A1* | 1/2014 | Gronowski ......... H04L 63/0421 709/206 |
| 2014/0133656 A1 | 5/2014 | Wurster et al. |
| 2014/0162601 A1 | 6/2014 | Kim et al. |
| 2014/0331286 A1 | 11/2014 | Davis et al. |
| 2015/0081566 A1 | 3/2015 | Slepinin |
| 2015/0100499 A1 | 4/2015 | Dua |
| 2015/0192988 A1 | 7/2015 | Aleksiev et al. |
| 2015/0227923 A1 | 8/2015 | Kutsch et al. |
| 2015/0248800 A1 | 9/2015 | Dawber et al. |
| 2015/0294149 A1 | 10/2015 | Palti-Wasserman et al. |
| 2015/0327316 A1 | 11/2015 | Hwang |
| 2015/0334523 A1 | 11/2015 | Lappetelainen et al. |
| 2015/0349960 A1 | 12/2015 | Bagley |
| 2015/0350902 A1 | 12/2015 | Baxley et al. |
| 2015/0371469 A1 | 12/2015 | Scalisi |
| 2015/0382156 A1 | 12/2015 | Gruteser et al. |
| 2016/0019736 A1 | 1/2016 | Radicella et al. |
| 2016/0065370 A1 | 3/2016 | Le Saint et al. |
| 2016/0065579 A1 | 3/2016 | Chen et al. |
| 2016/0150411 A1 | 5/2016 | Liu et al. |
| 2016/0154460 A1* | 6/2016 | von Liechtenstein ...................... H04L 63/102 345/156 |
| 2016/0171199 A1 | 6/2016 | Beatson et al. |
| 2016/0277012 A1* | 9/2016 | Lee ......... H04W 12/35 |
| 2016/0283603 A1 | 9/2016 | Langley |
| 2017/0013450 A1 | 1/2017 | Ziv et al. |
| 2017/0161978 A1 | 6/2017 | Wishne |
| 2017/0171178 A1 | 6/2017 | Reynders |
| 2017/0171200 A1 | 6/2017 | Bao et al. |
| 2017/0255915 A1 | 9/2017 | Chandrasekaran et al. |
| 2017/0316497 A1 | 11/2017 | Song et al. |
| 2018/0032712 A1 | 2/2018 | Oh et al. |
| 2018/0165508 A1 | 6/2018 | Othman et al. |
| 2018/0176017 A1 | 6/2018 | Rodriguez et al. |
| 2018/0219861 A1 | 8/2018 | Schultz et al. |
| 2018/0248704 A1 | 8/2018 | Coode et al. |
| 2018/0287800 A1 | 10/2018 | Chapman et al. |
| 2018/0302743 A1 | 10/2018 | Bai et al. |
| 2018/0322587 A1 | 11/2018 | Linne |
| 2018/0336564 A1 | 11/2018 | Chen |
| 2019/0007275 A1 | 1/2019 | Clemm et al. |
| 2019/0080189 A1 | 3/2019 | Van Os et al. |
| 2019/0098004 A1 | 3/2019 | Mars et al. |
| 2019/0098505 A1 | 3/2019 | Mars et al. |
| 2019/0124049 A1 | 4/2019 | Bradley et al. |
| 2019/0165943 A1 | 5/2019 | Chari et al. |
| 2019/0197430 A1 | 6/2019 | Arditi |
| 2019/0228780 A1 | 7/2019 | Athias |
| 2019/0251526 A1 | 8/2019 | Jackson |
| 2019/0268332 A1 | 8/2019 | Wang |
| 2019/0289003 A1 | 9/2019 | Setchell et al. |
| 2020/0250896 A1 | 8/2020 | Vossoughi |
| 2020/0349557 A1 | 11/2020 | Jivraj et al. |
| 2021/0076212 A1 | 3/2021 | Manikantan Shila et al. |
| 2021/0158350 A1 | 5/2021 | Gaddam et al. |

(56) References Cited

U.S. PATENT DOCUMENTS

FOREIGN PATENT DOCUMENTS

| CN | 106464500 A | 2/2017 |
| CN | 106530454 A | 3/2017 |
| EP | 0486657 B1 | 12/1994 |
| EP | 2428774 A1 | 3/2012 |

OTHER PUBLICATIONS

Search Report dated Sep. 27, 2019 for PCT Application No. PCT/US2019/037553.

Keltoum Bendiab et al., "WiP: A Novel Blockchain-based Trust Model for Cloud Identity Management", 2018 IEEE 16th Intl, Conf. on Dependable, Autonomic and Secure Computing, 16th Intl. Conf. on Pervasive Intelligence and Computing, 4th Intl. Conf. on Big Data Intelligence and Computing and Cyber Science and Technology Congress, 2018, pp. 724-729, Athens, Greece.

David W. Kravitz et al., "Transaction Immutability and Reputation Traceability: Blockchain as a Platform for Access-controlled IoT and Human Interactivity", 15th Annual Conference on Privacy, Security and Trust, 2017, pp. 3-12.

Jong-Hyouk Lee, "BIDaaS: Blockchain Based ID As a Service ", IEEE Access, 2018, vol. 6, pp. 2274-2278.

Tomas Mikula et al., "Identity and Access Management with Blockchain in Electronic Healthcare Records", 2018 21st Euromicro Conference on Digital System Design (DSD), 2018, pp. 699-706, Prague, Czech.

Ahmad Sghaier Omar et al., "Identity Management in IoT Networks Using Blockchain and Smart Contracts", IEEE International Conference on Internet of Things and IEEE Green Computing and Communications and IEEE Cyber, Physical and Social Computing and IEEE Smart Data, 2018, pp. 994-1000, HalifaAx, NS, Canada.

Paul Dunphy et al., "A First Look at Identity Management Schemes on the Blockchain ", IEEE Security & Privacy, Aug. 6, 2018, vol. 16, No. 4, pp. 20-29.

\* cited by examiner

METHODS AND APPARATUS FOR PRESENCE SENSING REPORTING

CROSS-REFERENCE TO RELATED APPLICATIONS

The present application is a non-provisional of 62/935,000 filed Nov. 13, 2019 and is a continuation-in-part of and claims priority to U.S. patent application Ser. No. 16/573,806 filed Sep. 17, 2019 which is a continuation-in-part application of PCT application. No. PCT/US19/37553 filed Jun. 17, 2019, that is a non-provisional of and claims priority to U.S. Provisional App. No. 62/685,292 filed Jun. 15, 2018, and is a non-provisional of U.S. Provisional App. No. 62/789,063 filed Jan. 7, 2019. These references are incorporated by reference herein, for all purposes.

BACKGROUND

This invention relates generally to systems, methods and devices for first party identification and more particularly to systems, methods and devices for a universal ID.

Presently, attempts to create what the inventors refer to as a universal identification (ID) signal for an individual, have involved frameworks or underlying models in which the burden of implementing the signal—broadcasting it and ensuring that devices detect it—rests on the individual. This task of creating a personal signal, or what the inventors refer to as a transponder or beacon, is beyond the technical domain of the vast majority of users. This is one of the barriers that has prevented the growth of a universal identification signal for individuals, universal in the sense that the signal is not tied to or detectable only by a specific manufacturer, social media or network provider, or company.

One of the inventors' goals of a universal identification signal is to allow a user to identify and interact with a variety of physical world devices or objects by different manufacturers in a manner that allows for strict data control, security, and privacy. In contrast, current user ID models follow a "silo" model. In typical silo models, users emit a specific ID signal via a specific application on a specific device, such as from a smart phone, and the specific ID signal is only detectable by a specific entity, such as an appliance manufacturer, a car manufacturer, or online social media provider, or the like. The specific IDs are thus not universal, for example a Hilton user ID cannot be used for boarding a United Airlines flight. These siloed systems do not provide sufficient mapping to physical, real world environments and spaces that is needed to be useful, safe, and secure.

The inventors believe the silo model of user identification signals where each vendor, each hotel, each apartment, and the like is highly disadvantageous to users and more importantly to their smart devices. Some disadvantages include that the multiple applications take up large portions of the memory in smart devices, crowding out memory for photos, videos, other applications, and the like; another disadvantage is that when executing more than one of these silo applications, the performance of the smart device is impacted because there are large amounts of data that need to be cached for each of the programs, and switching between programs often become sluggish; another disadvantage is that having a large number of applications running at the same time can cause memory management problems in the user's smart device, causing crashes and other anomalous behaviors; and the like. Accordingly, the inventors believe the silo model often adversely affects the performance of smart devices.

There are some implementations, presently in limited use, that essentially leverage one online identity or profile to interact with various types of devices. Besides the security and data control/privacy concerns this raises, such single online personas do not truly reflect how individuals behave or act in the real, physical world. Human interactions with physical environments have developed over millennia, as such, it should not be expected that this behavior be reflected in online personas.

Other factors that have prevented universal or even quasi-universal signal technology from widespread adoption include generally a lack of motivation from manufacturers and companies to create their own apps, portals, back-end infrastructure, and so on, that would be needed to implement a signal or beacon framework with their customers. Again, this leads to a siloed approach that is simply not worth the expense and maintenance for many entities. Returning to the first point of placing too much of the technical burden of implementing universal signals on the users, it is certainly possible to create sensing points in an environment, but this framework requires that users modify their behavior, act in a different way and actually require that additional actions be taken by users. What is needed is a framework that does not require this of users and where the physical world or environment be essentially smarter and place minimal additional burden on the users to allow for seamless natural interactions.

SUMMARY

This invention relates generally to systems, methods and devices for first party identification and more particularly to systems, methods and devices for a universal ID. With embodiments of the present invention, storage memory of smart-devices is increased due to the reduced number of applications and programs that need to be stored, and the performance of the smart-devices is increased due to the lower number of applications required to operate simultaneously, while still providing the functionality desired by a user. In various embodiments, the reduction in demand on smart-device resources provide advantages to a smart device in terms of amount of free memory available for applications and the speed and efficient performance of applications running upon the smart device.

One aspect disclosed is a method of enabling a universal identifier signal, also referred to as a universal personal transponder (e.g. transceiver), using a beacon apparatus and a detector apparatus that performs as a scanner or sensor. In various embodiments, the beacon apparatus may be a smartphone, wearable device or other smart apparatus carried by a user, and broadcasts what is referred to as an ephemeral identifier (ID). This ephemeral ID is typically enabled by an application installed on the smartphone or smart apparatus. The ephemeral ID is then detected or sensed by a detector device which may be constantly scanning the environment for ephemeral IDs and related data. In various embodiments, the detector can be built into a wide variety of devices, such as appliances, electronic equipment, public kiosks, controlled access points and the like. As described below, the detector device resolves the ephemeral ID to a user of a specific beacon apparatus, that is, the ephemeral ID is matched to a specific registered individual or user. A dedicated server, typically operated by a (e.g. universal) signal service provider, receives at least a portion of the ephemeral ID and verifies an access-control list (i.e. determines stored user data) associated with the specific registered user associated with the ephemeral ID. A first set of user data is then transmitted from the dedicated server to the detector device, such as a controlled access point (e.g. door lock, security door, turnstile, security system, elevator, gate), a coffee machine, kitchen appliance, TV monitor, point of sale device, loyalty card kiosk, automobile, appliance, vending machine, environmental controls, etc. The detector device then performs operations based upon the first set of user data to enable substantive and meaningful interactions with the beacon (i.e., the user), such as unlocking a lock, turning on lights, registering the user, or the like. In some embodiments, the actions required by the beacon device are reduced or minimized and the majority of the operations are taken on by the detector device. That is, the user and the user's smartphone does not need to perform any proactive operations or acts in order to have the user's universal ID signal be recognized by the door lock or have meaningful interaction with the door lock, such as unlocking the door for the user. In other embodiments, the beacon device may perform some of the access functions with the dedicated server automatically, without specific user interaction.

In another aspect of the invention, a system for implementing a universal personal transponder environment includes a beacon apparatus carried by a user that includes universal personal ID transponder software. The user enters an environment or space that has one or more scanner devices which are constantly scanning for a universal ID signal being emitted by the beacon by virtue of the transponder software. The detection of the universal ID signal occurs with minimal operations or actions needed by the user or the beacon apparatus. The software module on the beacon enables interaction with nearly any type of scanner device that has the necessary transponder software and hardware connectivity component. A dedicated server has a database for storing various types of data and multiple software modules for implementing the universal personal transponder environment. In some cases, the server may be operated and owned by a universal personal transponder service provider (SAAS) which operates the system for the benefit of the user and the scanner or detector device manufacturers or operators which may include a wide variety of device from door locks to electronic equipment. In other cases, the server may be operated and/or owned by a detector device manufacturer (e.g. controlled access point) and still be compatible with the universal ID signal from the universal ID software. In some embodiments, the majority of the processing and proactive steps needed to implement the environment is done by the scanner device which queries or monitors the beacon (e.g., smartphone) for ephemeral ID data, communicates with the server, and performs a responsive physical action. In various embodiments, the beacon also performs some steps to ensure security and authentication of the user via biometric scanner, password, or the like. In some embodiments, the burden of initiating the process and establishing a session is performed by the scanner device sensing the ephemeral ID.

According to one aspect of the invention, a method is described. One process includes scanning with a short-range transceiver in a first device for ephemeral ID signals within a geographic region proximate to the first device, and detecting with the short-range transceiver, an ephemeral ID signal output from a user device, wherein the ephemeral ID signal does not include personally identifiable information of the user. One method includes transmitting with a wide-area network communication unit in the first device, at least a portion of the ephemeral ID signal and a first identifier associated with first device to a remote server associated with the ephemeral ID signals and receiving with the wide-area network communication unit, a first reply from the remote server in response to the portion of the ephemeral ID signal and to the first identifier. One technique includes providing an electronic authorization signal to a first external unit coupled to the first device in response to the first reply, wherein the first external unit is configured to perform a first physical action in response to the first reply.

According to another aspect of the invention, a system including a first device is disclosed. In one apparatus, the first device includes a short-range transceiver configured to capture ephemeral ID signals within a geographic region proximate to the first device and configured to detect an ephemeral ID signal output from a user device, wherein the ephemeral ID signal does not include personally identifiable information of the user. In another apparatus, the first device includes a wide-area network interface configured to transmit at least a portion of the ephemeral ID signal and a first identifier associated with first device to a remote server associated with the ephemeral ID signals and configured to receive a first reply from the remote server in response to the portion of the ephemeral ID signal and the first identifier associated with first device. In yet another apparatus, the first device includes an output unit configured to provide an electronic authorization signal to a first external unit coupled to the first device in response to the first reply, wherein the first external unit is configured to perform a first physical action in response to the first reply.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
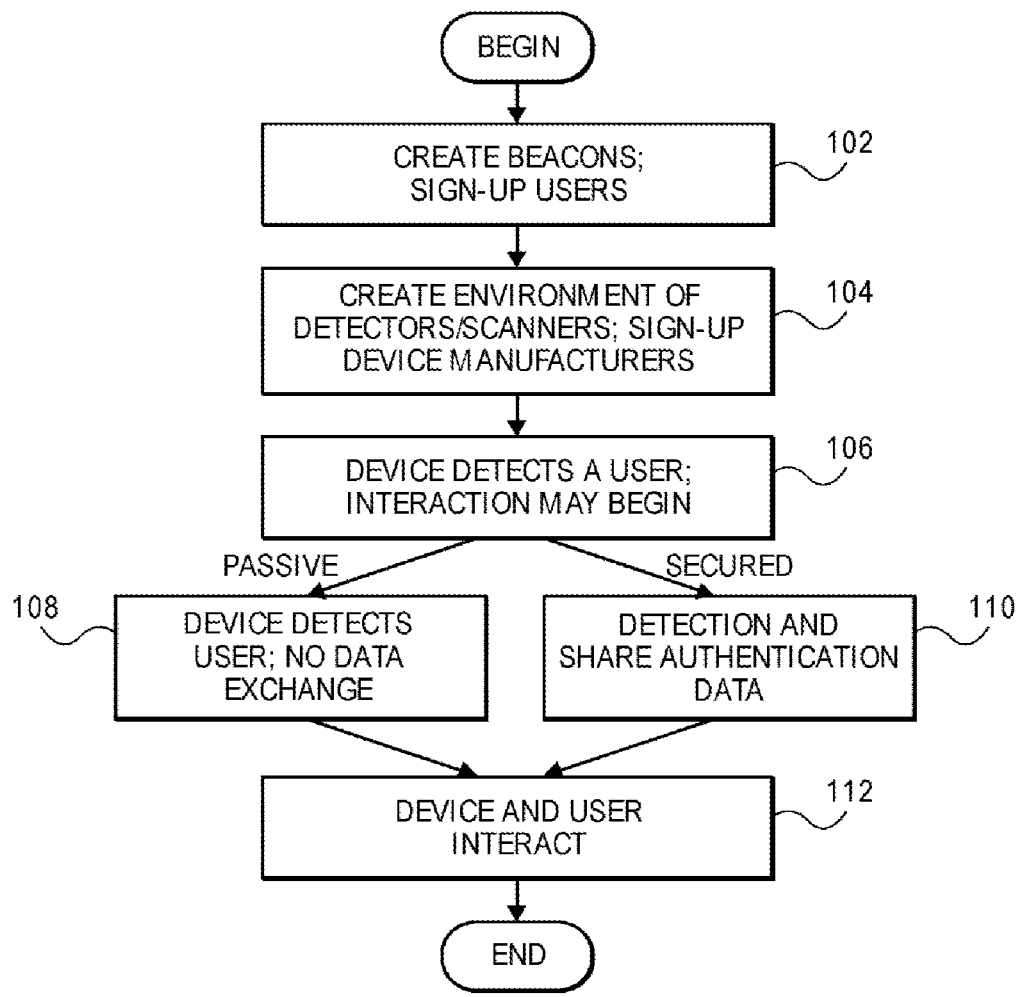
FIG. 1 is an overview flow diagram of a process in accordance with various embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the described embodiments as defined by the appended claims.

For example, methods and systems will be described in the context of creating, utilizing, and managing security and authentication for a universal, personal ID signal. In the following description, numerous specific details are set forth in order to provide a thorough understanding of the various embodiments. Particular example embodiments may be implemented without some or all of these specific details. In other instances, well known process operations have not been described in detail in order not to unnecessarily obscure the described embodiments. Various techniques and mechanisms will sometimes be described in singular form for clarity.

It should be noted that some embodiments include multiple iterations of a technique or multiple instantiations of a mechanism or technique unless noted otherwise. For example, a system uses a processor in a variety of contexts. However, it will be appreciated that a system can use multiple processors while remaining within the scope of the described embodiments unless otherwise noted. Furthermore, the techniques and mechanisms will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various embodiments describe providing universal identity and physical presence detection in the form of a personal, universal signal. This signal allows a user to interact with devices in the user's environment without having to download vendor-specific apps, set up vendor-specific accounts or be limited to a siloed eco-system of a manufacturer brand. Such a personal universal signal representing an individual allows for devices and software to detect and query the beacon transmitting the signal for information relating to the user and augmented onto the physical environment. This provides a more personalized, efficient, and, in some instances, secure experience for the user.

The embodiments focus on reducing or minimizing user workload to allow for seamless interactions with her environment, such as, for example, the user being able to walk up to a TV anywhere in the world and having the TV (using the user's universal signal) detecting the user and querying for the user's personal preferences and accounts. The user can then, using voice commands, for example telling the TV to play their favorite TV show by saying "play Game of Thrones." The TV, using the user's authenticated universal signal can then access the user's personal preferences and accounts (e.g., Netflix account), and can then pull up the show and play it automatically. This can be done without the user using a specific app on the TV, setting up a TV specific account, logging into accounts, or owning the TV. In another example, a user can walk up to a door, and have the door automatically unlock for the user, once the user reaches a sufficiently close distance so that the user can passively walk through the door without having to do anything. In such examples, this is because the door sensed the user's universal signal ID, verified that the user has access to pass through the door and unlocks the door for the user. Again, this is done without the user being tied to the door manufacturer, or device, or to a specific account or app needed to serve such interaction. As such, the various embodiments provide and enable a universal signal for users and devices to interact, where all parties benefit from a seamless and natural way of interacting in the physical world.

Methods and systems for implementing a smart environment where a user's presence is sensed by a scanner are described in the various figures. In one embodiment, the environment is a physical space in which scanners detect the presence of a user via a universal identifier signal that is emitted from the user's mobile device which operates as a personal beacon. In this framework, the scanners perform most of the back-end operations and, for the beacon (e.g. a user's phone or watch), workload is significantly reduced. In this respect, by taking the burden of implementing the universal ID signal, the environment or physical space providing the framework may be described as intelligent or smart. The users simply need to do move around and behave normally. The devices around them in the space or environment they are moving in detects the users and the smart space performs the necessary communications and processing to realize the benefits described herein.

FIG. 1 is an overview flow diagram of a process in accordance with one embodiment. At step 102 an entity operates as a beacon and moves around in a physical space. In the described embodiment, the entity may be a human being and the space can be any environment such as a home, an office, a retail store, a lobby, a public space, a sidewalk, to name a few examples. Another way to describe it is that an entity can be any object or thing for which a universal ID signal would be useful, such as a car, bicycle, or animal. At step 104 an environment or space in which at least one scanner operates is created. A scanner can be manifested or implemented in many ways. In the described embodiment, a scanner (also referred to as "device" herein; beacons, typically mobile devices, are referred to herein as "beacon" "user" or "smartphone") can be a home appliance, door lock, monitor, a car, a kiosk, a consumer electronic device, and so on. The type of devices found in an environment or space will naturally be dependent on the nature of the space. At step 104, manufacturers or other entities which either make the scanners or operate or manage them are signed up and registered to have scanners in the environment. A home will have different types of devices than a retail store or an office lobby, and so on. A common feature of most devices or scanners in the described embodiment is that they are generally stationary; they are not expected to move around in the physical space, but they can, and the inventive concepts described herein would still apply. At step 106 a device detects a beacon by virtue of the beacon signal and initial interaction between device and beacon may begin.

The initial interaction may be one of two types. One is referred to as passive interaction shown in step 108. Here the device detects the presence of a beacon signal. The device may not determine the identity of the user, that is, the user remains anonymous. In another passive mode embodiment, the user may be identified but only in a dedicated server operated, typically, by a service provider, described below, and not on the device itself. Although generally this back-end server will be online, in one embodiment the server, that is, the service provider, may be accessible without an Internet connection or being online (e.g., via Ethernet, Zigbee, and the like). This passive scanning or detecting presence of a beacon may be useful in various contexts, such as counting the number of people in a room or space, or whether someone just walked into a space. Essentially, the device wants to sense users around it, but the individual dictates the privacy. The user is the gatekeeper on his or her identity. The device that detects or sense the presence of the user may interact, it may do something, but that action does not have privacy concerns or require user authorization, hence, the passive nature of the interaction.

Another type of interaction that may be initiated is referred to as secured exchange where there is authentication of the user shown in step 110. Here tokens are used to authenticate and the device can make authorization requests. One example that illustrates this clearly is where the device is a door lock which detects the presence of a user and will only unlock if the user is authorized to open the door; the user must prove to the device (door lock) that she has access to open the door. In one embodiment, tokens are used to prove that the user is authorized. The beacon signal has at least one signed token from a back-end server that authenticates the user to the device. Once this authentication is made, the device will perform the relevant action and interact with the user. It may be noted that in either passive or secured exchange scenarios, the device may interact with the user as shown in step 112, but the level or degree of interaction will naturally vary.

Figure 2:
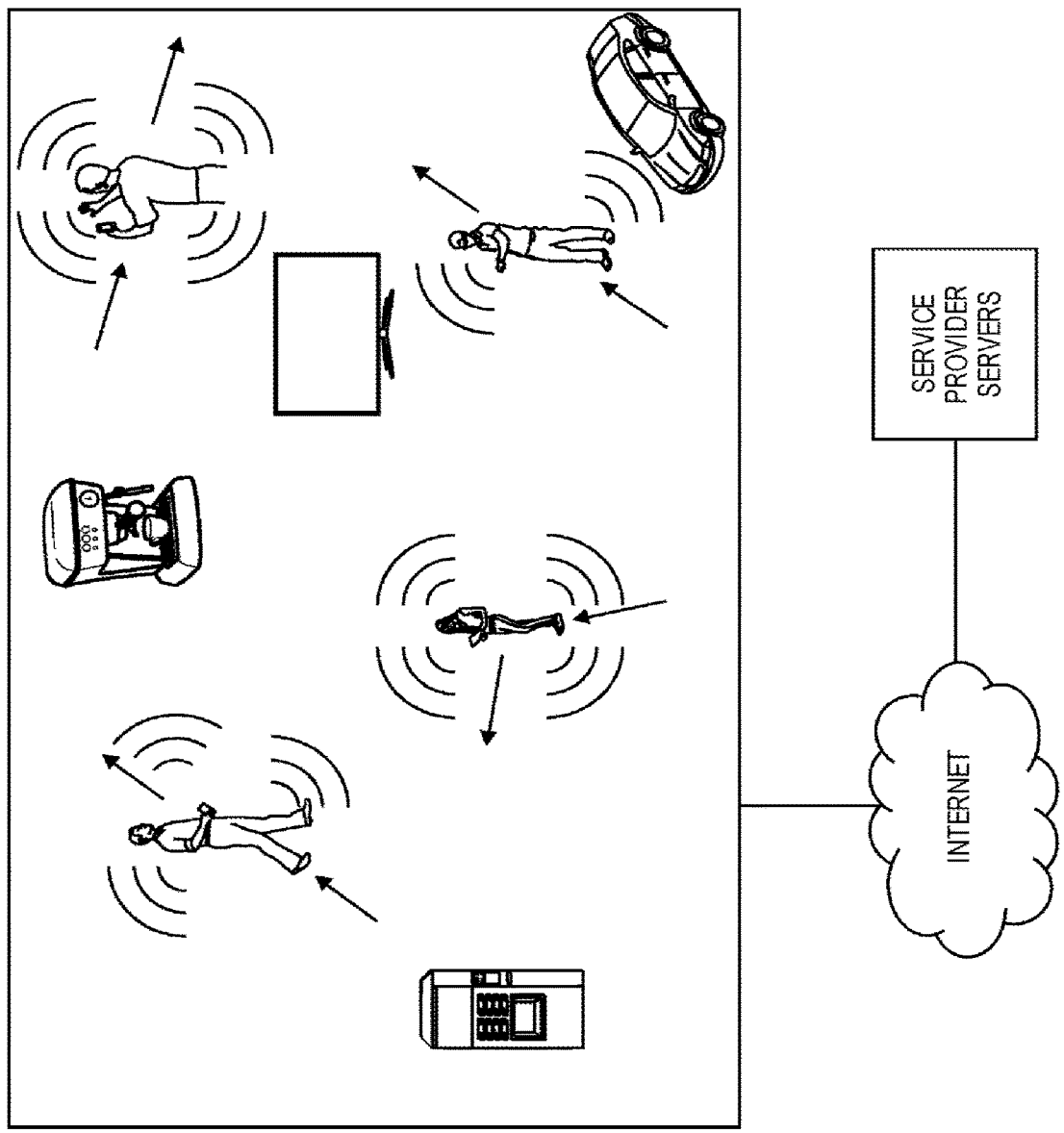
FIG. 2 is an illustration of a physical environment showing different types of devices and users with beacons.

FIG. 2 is an illustration of a physical environment showing different types of devices and users with beacons. Beacons can take various forms, most are Internet-enabled, but the most common are smartphones and wearables, such as watches or bracelets and may include bio-implants and other forms of personal mounted fixtures. As noted, the user will most likely be an individual, but may also be a moving object or an animal, such as a pet. Also shown are devices which can take on many forms, most are Internet-enabled. Devices may be home appliances and electronics, office equipment, ranging from refrigerators, coffee makers, door locks, TVs, vending machines, kiosks, cars, monitors, and so on. As described in greater detail below, a device may have its own server contained in it (to do universal signal actions) or may not need a service provider server at all. In the described embodiment the device accesses a service provider server to carry out some or all of the operations needed for the present invention. A service provider server, also referred to as the back-end server, is also shown. This server has numerous roles, but one of the primary ones is to authenticate the user and maintain access-control lists for beacons and devices. This back-end server is maintained and operated by the universal ID signal service provider which is responsible for implementing the universal ID signal and smart environment of the present invention. It provides a software module or app (application) that the user installs on her smart phone or wearable thereby enabling it as a personal beacon. And it provides software, hardware or both to device manufacturers and operators. For example, it can provide a software development kit (SDK) for the manufacturer or detector/scanning hardware, such as a Bluetooth module or sensor, if the manufacturer or device operator needs such a hardware component to put in their device. For example, a lock manufacturer may not have the technical means or desire to obtain the appropriate sensor desired for the invention so the service provider can provide the sensor hardware to them and instruct them on how to install it. The device manufacturer will decide what type of capabilities their device(s) will need when interacting with users and what type of security and authorization will be required from its users. It instructs the service provider on what data it needs from the beacon in order to interact securely and safely with its users.

Figure 3:
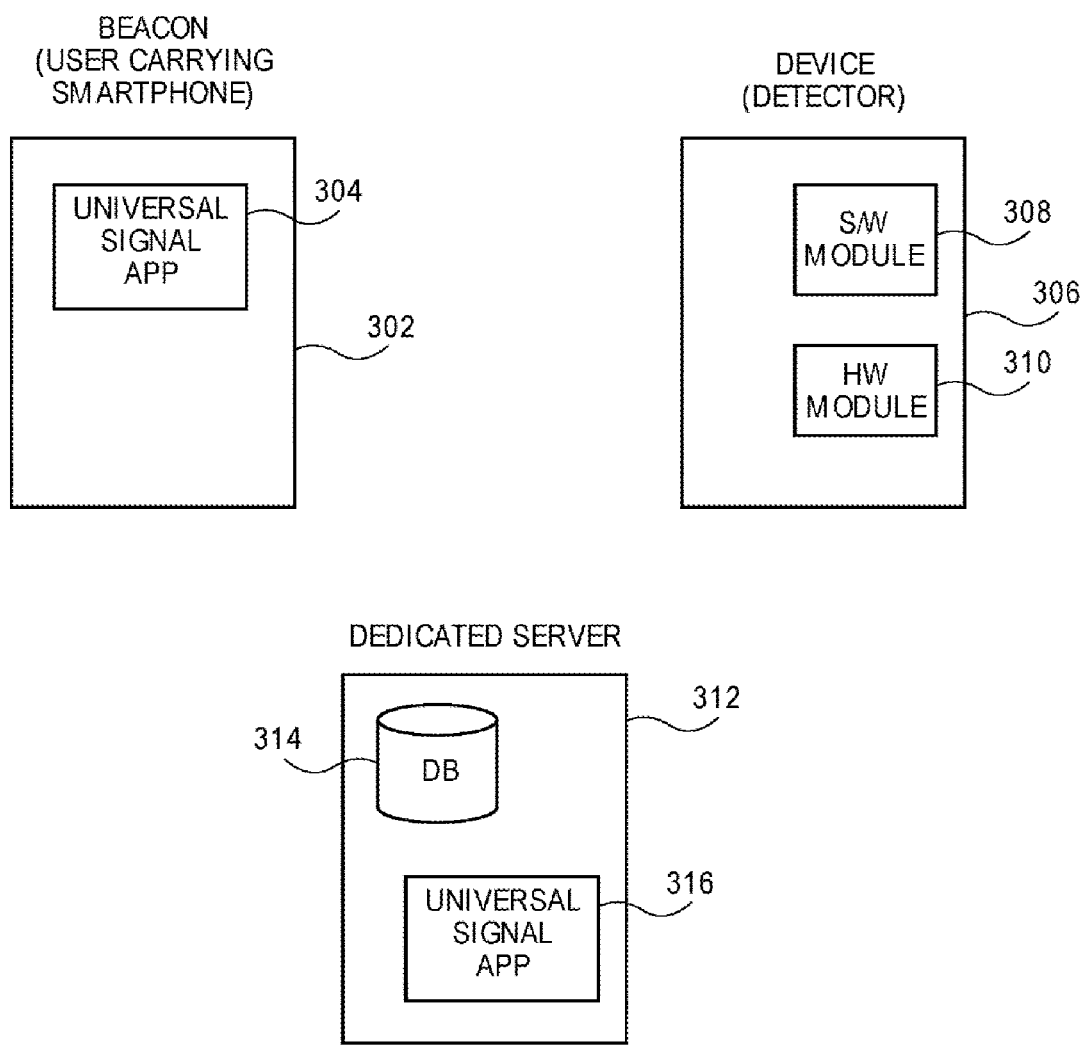
FIG. 3 is a block diagram showing some components for various embodiments of the present invention.

FIG. 3 is a block diagram showing three primary components needed for implementing various embodiments of the present invention. A user acts like a beacon 302. The user, in nearly all instances, a single individual (in some cases a "user" may be a group of people like a family, a group of co-workers, a team, etc.) carries an apparatus that acts as the beacon. As noted, this can be a smartphone, bracelet, watch, or any suitable wearable device. Beacon 302 has installed on it a service provider software module 304, that implements the personal universal ID signal of the present invention.

A device 306 acts as the detector or scanner in the environment. As described, device 306 can take the form of one of a multitude of objects from ranging from appliances to electronic equipment to public vending machines. Nearly all have a software module 308 that is provided by the service provider and installed either by the provider or by the manufacturer. Software module 308, as well as module 304, performs many of the operations described in the flow diagrams below. In some embodiments, device 306 may also have a hardware component 310, such as a Bluetooth component or other hardware needed for connectivity (e.g. transmitter and receiver) with beacon 302 or with a dedicated server, the other component in FIG. 3. This hardware component may be provided by the service provider.

A service provider server 312 is operated and managed by the universal ID signal provider and may have extensive software modules, such as the universal signal app 316, and at least one database 314 which stores data on beacons (users), devices, access control tables, and a wide variety of data needed to implement the universal signal environment of the present invention.

Figure 10:
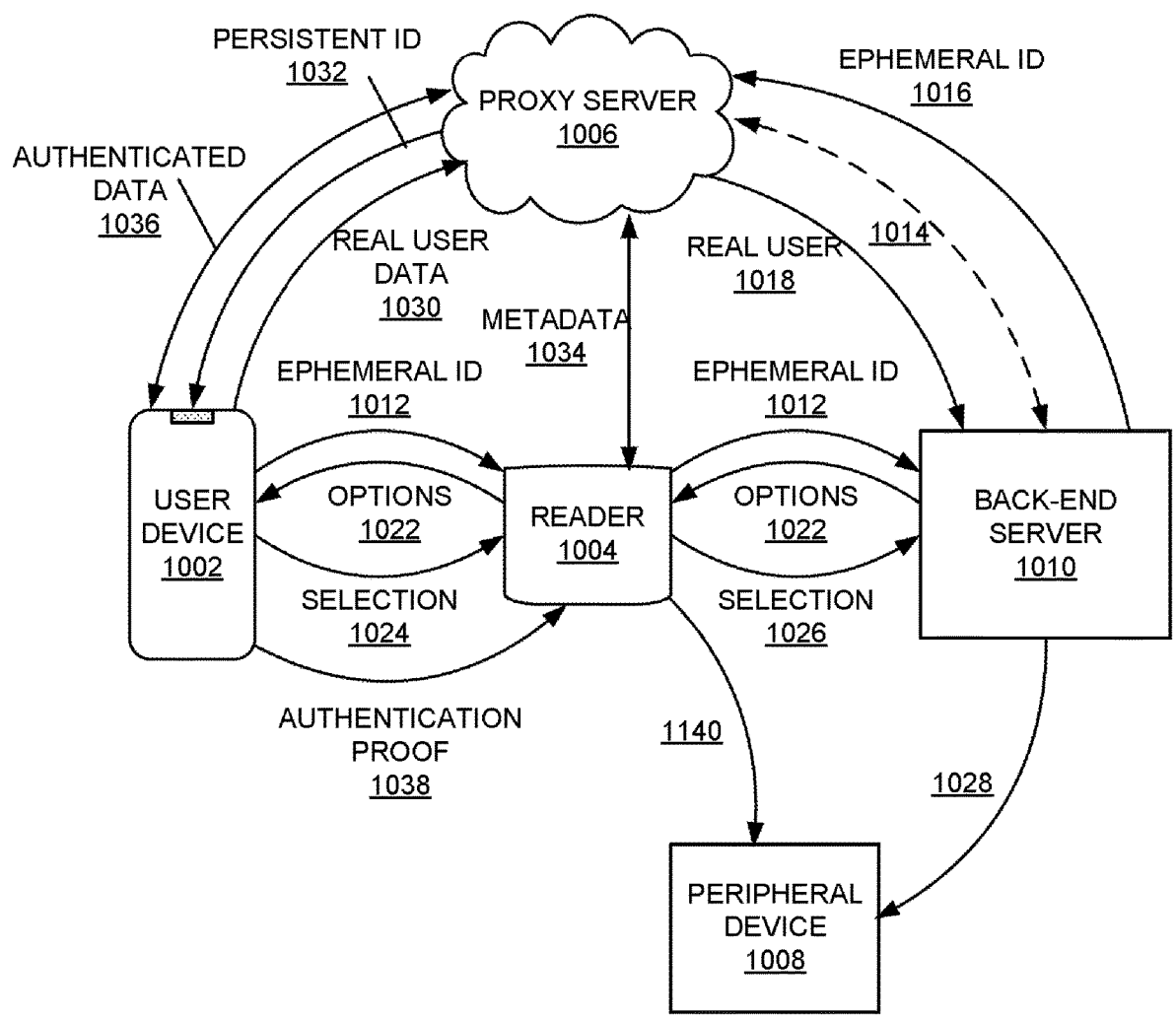
FIG. 10 is a block diagram of a process according to various embodiments of the present invention.

FIG. 10 illustrate a logical flow diagram illustrating the process described below in FIGS. 4A and 4B and FIG. 5. In FIG. 10 systems are illustrated including a user device (e.g. a smart phone, smart watch, ring, tablet, wearable device, augmented reality glasses) 1002 coupled to a reader 1004 and to a cloud-based server 1006, and a peripheral device 1008. In FIG. 10, a peripheral access control system (PACS) 1010 is also illustrated coupled to cloud-based server 1006 and to peripheral device 1008.

Figure 4A:
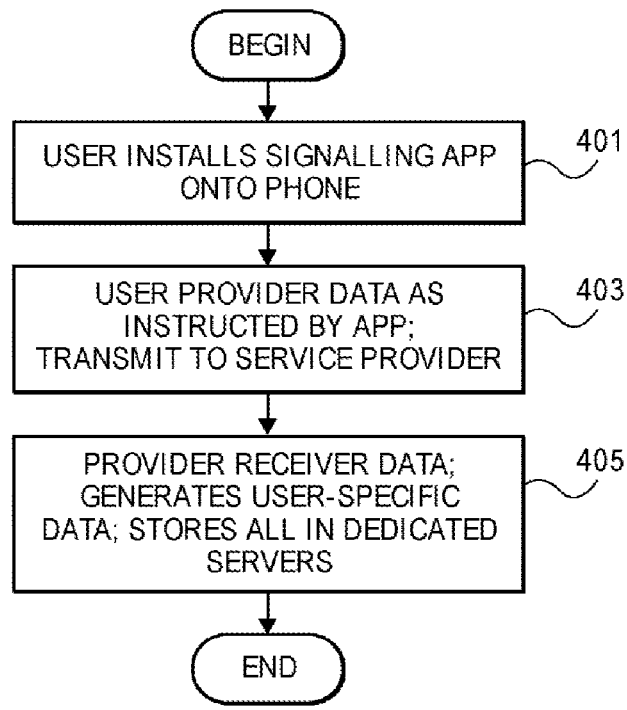
FIG. 4A is a flow diagram of a process of a user joining the universal ID signal framework as implemented by a service provider in accordance with some embodiments.

FIG. 4A is a flow diagram of a process of a user joining the universal ID signal framework as implemented by a service provider in accordance with one embodiment. A user, typically an individual, has decided to join the universal ID signal framework. In one context, an employer may ask all of its employees to join so that the advantages of the universal signal can be realized in an office or company campus environment. The first step taken by the user is shown at step 401 where the user downloads a service provider universal ID signal app ("app") onto her smart phone 1002 or wearable apparatus (for ease of explanation, collectively referred to as "smartphone"). Generally, the app can operate in most widely used personal devices, platforms or operating systems, such as Android, iOS, and others that run on phones, watches, bracelets, tablets, bio-chips and the like. The application may also be termed a security application that runs upon the user's smart device.

Once downloaded and installed, at step 403 the user enters 1030 at least some required basic information about herself. In various embodiments, transmissions between user device 1002 and server 1006 are typically rf communication using Wi-Fi, cellular service (e.g. 4G, 5G, etc.), or the like. Some of the information can be entered at a later time depending on the apparatus that the app is being installed on. In one embodiment, a subset of the data entered by the user results in the creation of various identifiers. One may be referred to generically as a unique ID whose use is limited in that it is used primarily, if not only, by the service provider. This unique ID is not sent to the device, such as an appliance, door lock, coffee machine, etc. Another is a randomly generated identifier, referred to herein as a temporary or ephemeral ID. In some embodiments, the ephemeral ID may include random data, pseudo random data, or data selected from a predetermined set of data. In one embodiment, a portion of the ephemeral ID is provided 1032 to device 1002 and the full ephemeral ID may be generated within user device 1002 based upon the portion of the ephemeral ID from server 1006. In other embodiments, the ephemeral ID may be generated fully within user device 1002 based upon data specified by the app running upon the user device 1002 (e.g. data that identifies to reader 1004 that the ephemeral ID is broadcasted from the app on the user's smartphone. As described above, the ephemeral ID may be combined with random, pseudo random, or data selected from a set of data, or the like ("random"). In some embodiments, ephemeral ID may include at least a first portion including the "random" value and a second portion that includes data that authenticates the ephemeral ID as being authorized by server 1006. In some examples, the authenticating data may be a digitally signed message that reader 1004 may verify itself or with back-end server 1010 and server 1006, a private-key encrypted message that reader 1004 may decrypt itself or via a paired public-key via back-end server 1010 and server 1006, or the like. This ephemeral ID, for example, may be used for anonymous detection by a device of the user. Another identifier created from the user data and provided to 1032 user device 1002 is referred to as a persistent ID, an ID that can be characterized as stable and is created for each user/device manufacturer pair. For example, a user may have different persistent IDs for her relationship with the monitor, another for her relationship with the coffee machine, the car, the door lock, and so on. Each device manufacturer gets a distinct persistent ID for each user (assuming one device from each manufacturer). It may be described as a persistent or permanent version of an ephemeral ID. At step 405 the data entered and created at step 403 is stored in service provider 1006 or manufacture's own dedicated servers 1010, in most cases this will be the service provider servers.

Figure 4B:
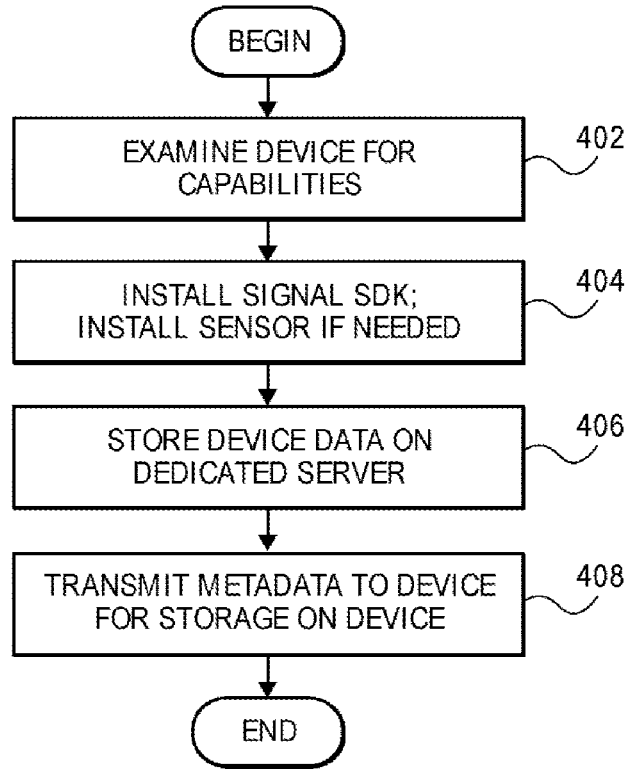
FIG. 4B is a flow diagram of a process of registering and initializing a device so that it can be a universal ID signal sensing device in a physical space in some embodiments.

FIG. 4B is a flow diagram of a process of registering and initializing a device so that it can be a universal ID signal sensing device in a physical space in accordance with one embodiment. At step 402 the service provider determines whether the device has the necessary hardware for being a scanner as needed for implementing the present invention (since the device is new to the space and universal ID framework, the service provider knows that the device does not have the universal ID app yet). The service provider obtains a wide variety of data and metadata about the device, items such as device name, category, location, identifier(s), make, model, time zone and so on. Some of this data is used to let the user know what the device is exactly when she encounters it in a physical real-world space and wants to decide whether to interact with it. However, the threshold question determined at step 402 is whether the device has the right hardware. If it does, the service provider only needs to supply and install universal ID signal software which, in the described embodiment, is in the form of a software development kit (SDK) as shown in step 404. If the device does not have the right hardware for scanning (some smaller scale manufacturers may not have the means or technical skills to include this hardware in their product) the service provider provides one. In this case the software module and the sensor hardware are installed on the device which may be done by the device maker or the service provider.

At step 406 information describing the device is stored by the service provider in a database. This data may be used for enabling interaction between the device 1004 and the beacon 1002. In some scenarios, the data for this interaction may be stored on the device itself wherein the service provider does not play an active role. Some examples of data stored include device ID, single key, private/public key pair, set of commands and interactions, actions the user or device can take, a template which can be customized for different devices. In one embodiment, a template may be described as a pre-defined schema of attributes and metadata. In a simple example, a template for a door lock can have "lock" and "unlock" whereas a template for a car would likely have many more options. At step 408 metadata describing to the device and templates are transmitted 1034 to the device and stored there.

At the end of FIG. 4B, the device is now capable of detecting or sensing a beacon 1002 when a beacon with the universal ID signal app executing on it is in the presence of the device 1004. FIG. 5 is a flow diagram of a process of passive detection of a universal signal presence in accordance with one embodiment. With continued reference to the example in FIG. 10, in FIG. 5, at step 502 a user (as noted, the term "user" is interchangeable with "beacon" and "smartphone" 1002) enters an environment or physical space that has scanning devices, e.g. 1004. It is important to note here that the user is in control of her personal universal ID signal. The user can turn the signal on (by executing the app downloaded at step 401) or not turn it on. There are also measures that can be taken to ensure that the universal signal is coming from the right individual and not an imposter or some other intentional or unintentional unauthorized person. At step 502 the user turns on the signal via a smartphone or wearable apparatus 1002 once another factor has passed. For example, the signal turns on only after a smart watch has detected the user's heart pattern or other biometric means to verify the identity of the user wearing the watch or carrying the smartphone. Only at this point is the signal turned on. This prevents other individuals from impersonating the user by wearing the user's smart watch or other wearable. At step 504 a beacon 1002 in the environment broadcasts 1012 the ephemeral ID. In some embodiments, transmissions between beacon 1002 and reader 1004 may be performed via short-range communications, such as BLE, Zigbee, NFC, or the like. At step 506 a device 1004 detects or senses the beacon 1002 and reads the beacon's ephemeral ID. A non-persistent minimal connection is established initially between the beacon and the device. The universal ID signal app does not tie up the device exclusively (unlike other IoT devices). Because of the non-persistent nature of the connection some typical scaling issues are avoided. No permanent bonding or tie-up is needed in the personal universal ID signal implementation and framework of the present invention.

Steps 502 to 506 describe what can be referred to as a sub-process for ambient sensing of the beacon 1002 by a device 1004. It may be characterized as the simplest use case scenario for the universal ID signal. Ambient sensing can be used in scenarios where users simply have to be distinguished from one another, such as counting how many users are near a device or in a room. This ambient sensing may also be seen as a way for a user to potentially communicate with a device if needed. As illustrated in FIG. 10A, if communication 1014 is possible and the dedicated server, such as a service provider server 1006, can be accessed, the process continues with step 508. In another embodiment, the dedicated server 1006 can be accessed via another communication means, such as Bluetooth, Ethernet, and the like. At step 508, the service provider server 1006 learns private data about the user. It does this by taking 1016 the ephemeral ID or persistent ID and resolving it to a persistent ID or an actual or real user identifier 1018 (as noted, prior to this step, the user was merely an anonymous but distinguishable entity). At step 512 the back-end 1010 receives and verifies permissions attached to the user by examining an access control list. At step 514 the back-end 1010 sends 1022 user data (e.g. options) based on the access control list to the device 1022 via reader 1004, in other words, it sends 1022 to the device 1002 only data about the user that the device 1002 is allowed to see (e.g. options available to the user of device 1002 such as user transaction history, user account status, amount of stored-value remaining, etc.). In some examples, where a peripheral device 1008 is a controlled access point 1008 (e.g. door), an option available may be to unlock or unlatch; where peripheral device 1008 is a television, an option available may be to select from a list of subscription services. In some embodiments, an option may be manually selected by the user on device 1002 and the selection may be sent 1024 to reader 1004, whereas in other embodiments, if there is one option or a default option, the option need not be sent, or the option may automatically be selected by device 1002 and sent back to reader 1004.

In various embodiments, reader 1004 may send 1026 the selected option to back-end 1010, and if authorized, back-end 1010 directs 1028 peripheral device 1008 to perform an action. In the example where peripheral device 1008 is a door, the instruction may be to activate a solenoid, or the like, in a strike plate and allow the user to pull or push open the door; in the example where peripheral device 1008 is a television, the instruction may be to run a Netflix application on the television and to log into Netflix using the users credentials, for example; and the like. In various embodiments, the back-end 1010 stores a matrix of permissions, policies, preferences, and the like regarding users and devices. In one embodiment, it uses the user's persistent ID which, as noted, is particular to that user and a specific device pairing.

In some embodiments, if communication 1014 is not possible in real-time, resolving ephemeral ID may be performed via the transfer of server-authenticated data by smart phone 1002 to reader device 1004, described below, and/or may be performed via the transfer of signed tokens from server 1006 to smart device 1002 described in FIG. 6.

Returning to step 506, if there is no ephemeral ID or the data needed is already on the device, characterized as a "local only" option, the data needed for sensing the beacon 1002 is on the device 1002 itself and user data is requested from the device instead of from a service provider server.

Figure 5:
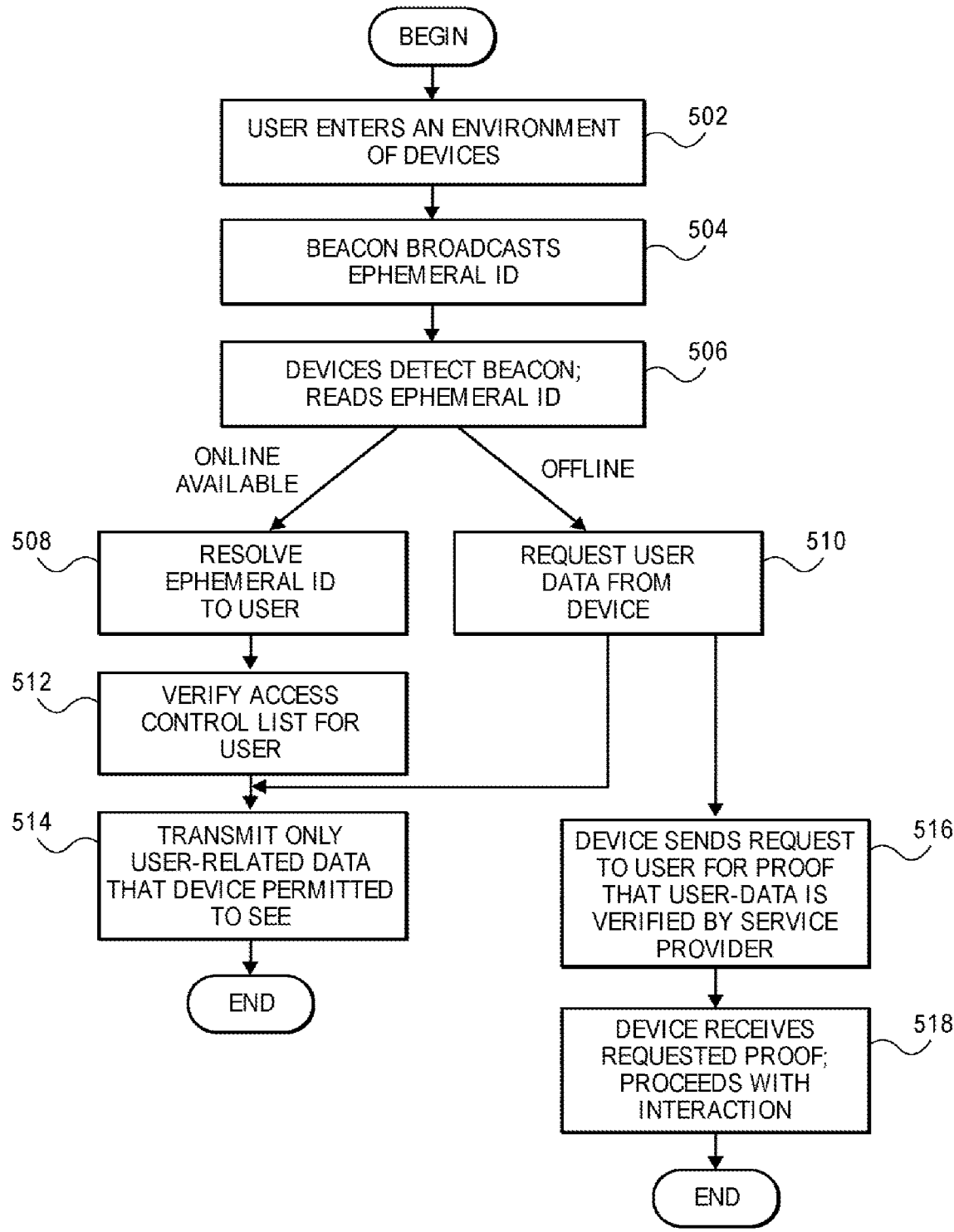
FIG. 5 is a flow diagram of a process of passive detection of a universal signal presence in accordance with some embodiments.

The passive branch shown in FIG. 1 has been described in FIG. 5 steps 502 to 514. Steps 510, 516, and 518 illustrate the secure branch from FIG. 1. As noted, at step 510, in the "local only" step, when the device 1004 (or back-end server 1010) does not access service provider servers 1006 via the Internet, user data is requested from the device. Steps 516 and 518 are needed because the service provider 1006 is not able to authenticate user data (e.g. ephemeral ID or any type of data from the smartphone 1002. The perspective of the queries and actions taken in steps 516 and 518 are from the device 1004 perspective. At step 516 the device 1004 or, more specifically, the universal ID signal software module on the device, needs to be able to verify that data it is receiving from the beacon 1002 at some point has been verified by the service provider 1006 and is still valid. The device 1004 wants to see that the data (the data basically conveying, for instance, "I am John Smith's smartphone") has been vouched for by the back-end server, but that the authentication and identity data the device 1004 receives has been verified. In one embodiment, this is done without using any of the IDs described above (ephemeral, persistent, unique, etc.). Instead data used to verify the identity depends on the scanning device 1004. For example, the data could be an authenticated version 1036 of the user's driver license, or verification of the user's voice or face recognition as matched with a known hash of the user's voice recording or facial image (for example, stored on the user's smartphone) of the user as biometric authentication that the user is the correct, intended user. The authentication may be performed by cloud server 1006, or may be performed by cloud server 1006 in conjunction with a dedicated authentication server. Once the device 1004 receives 1038 this proof or is otherwise confident that the data it is receiving is authentic, control goes to step 518. Here the device receives proof from the smartphone that the user identity data is authentic and that the device 1004 can request performance 1028 of the action by peripheral device 1008 via server 1010, or in alternative embodiments, device 1004 can request 1140 performance of the action directly with peripheral device 1008. As described herein, actions may include unlocking a door, turning a TV on to the user's preferred channel, or make coffee how the user likes it.

Figure 11:
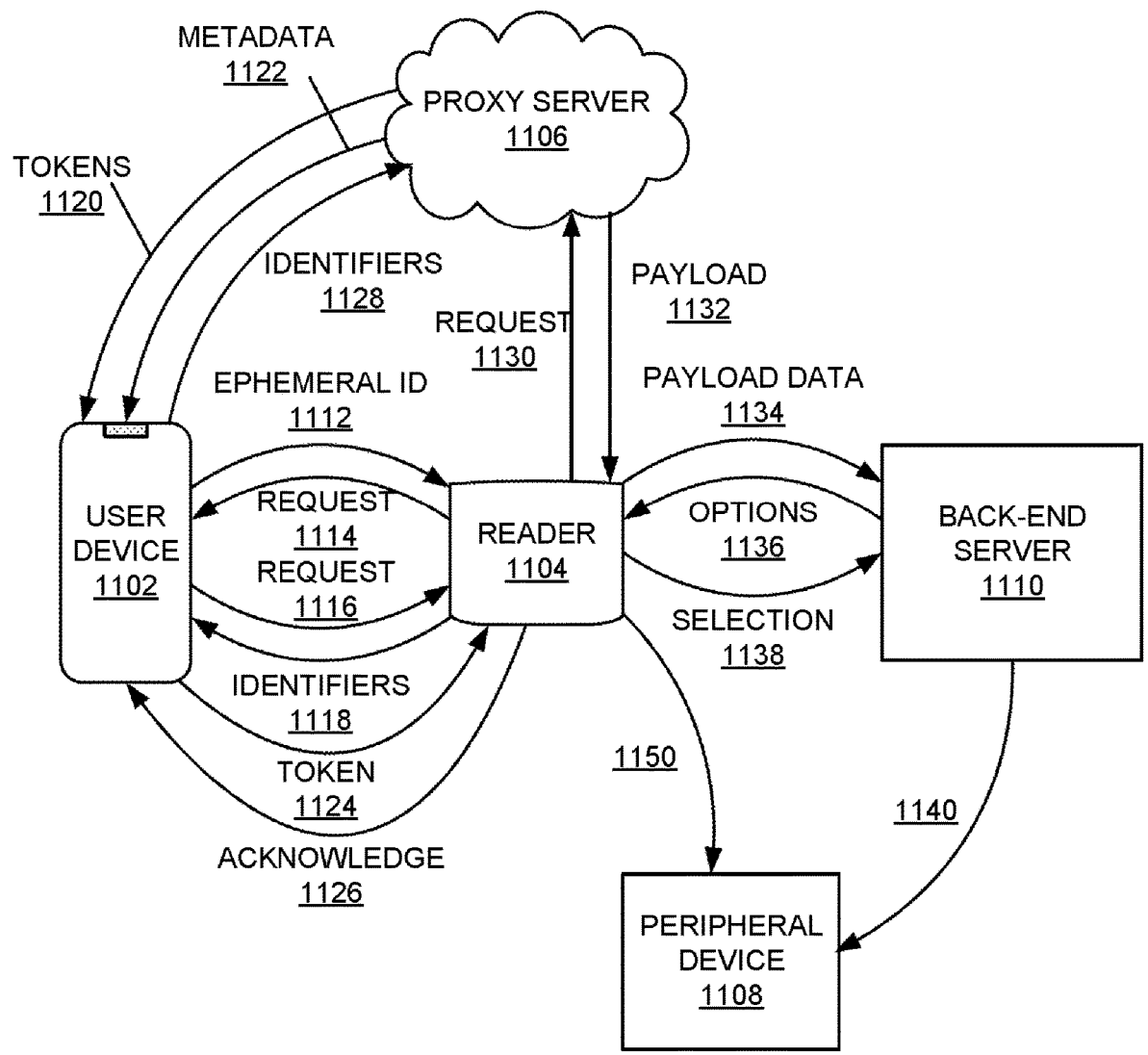
FIG. 11 is another block diagram of a process according to various embodiments of the present invention.

FIG. 11 illustrate a logical flow diagram illustrating the process described below in FIGS. 6-8. In FIG. 11 systems are illustrated including a user device (e.g. a smart phone, smart watch, ring) 1102 coupled to a reader 1104 and to a cloud-based server 1106, and a peripheral device 1108. In FIG. 11, a peripheral access control system (PACS) 1110 is also illustrated coupled to peripheral device 1108.

Figure 6:
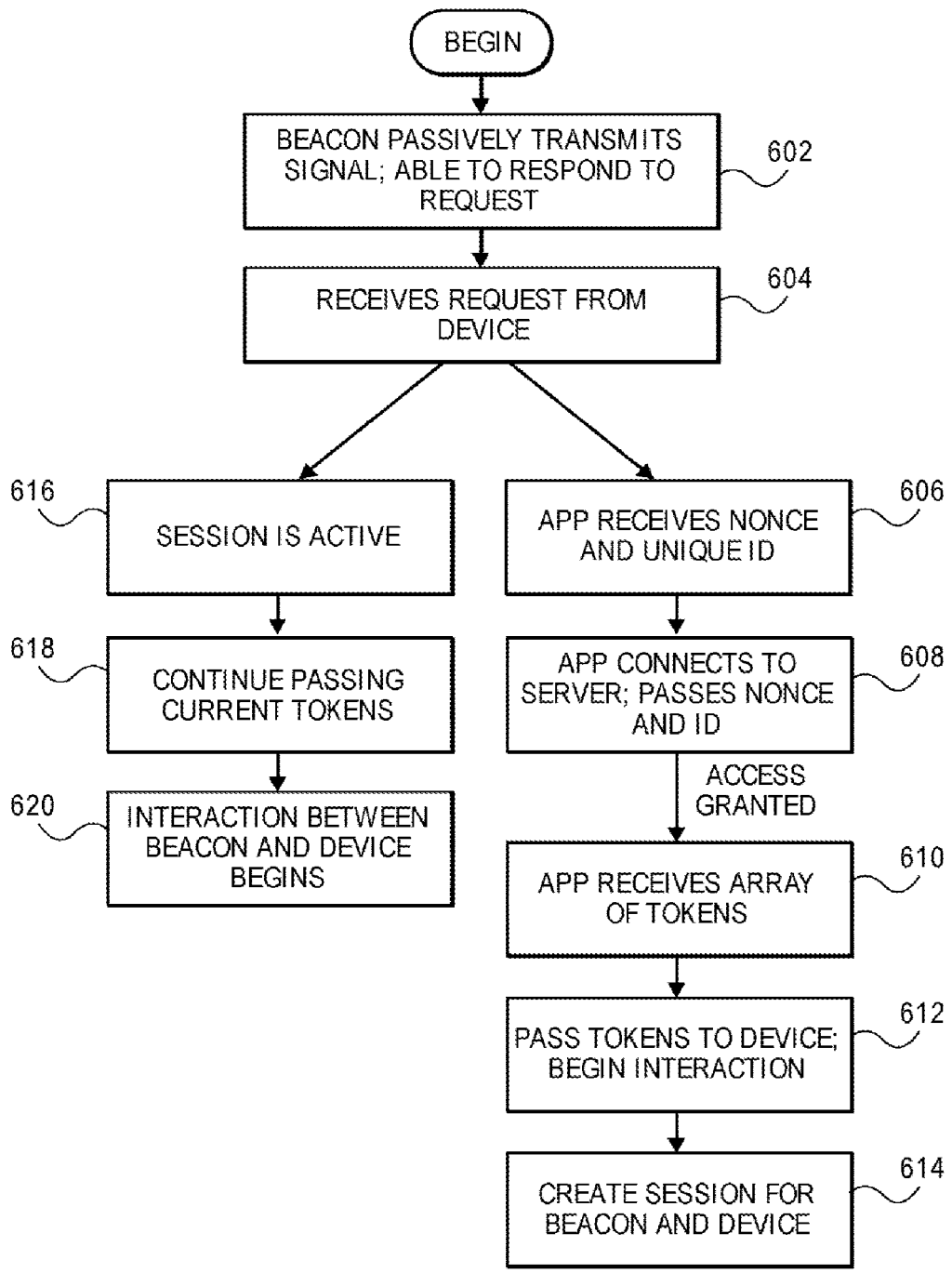
FIG. 6 is a flow diagram of a process of transmitting a universal ID signal between a beacon and a device and initiating interaction between them in accordance with some embodiments.

FIG. 6 is a flow diagram of a process of transmitting a universal ID signal between a beacon 1102 and a device 1104 and initiating interaction between them in accordance with one embodiment. At step 602 the smartphone or wearable 1102 being carried by a user has entered a physical space with universal signal-enabled devices 1104 and is passively transmitting 1112 a universal (ephemeral) ID signal. In some embodiments, transmission 1112 may be performed via short-range communications, such as BLE, Zigbee, NFC, or the like. Similarly. In one embodiment, this is done by the app in the background essentially when the beacon 1102 apparatus is powered on. In other embodiments, the app can be terminated or, in contrast, be in the foreground, and be transmitting a universal, personal ID signal. In various embodiments, reader 1104 may determine whether the ephemeral ID is in the proper format. If not, reader 1104 may ignore it, and if so, reader 1104 may generate a request. In some embodiments, the app is also able to detect a request 1114 from a device 1104 and respond. Although the beacon 1102 has the universal ID signal app from the service provider 1106, it does not need anything from the device 1104 manufacturer in order to receive the request from the device 1104 or respond to it. As noted above, the invention bypasses any form of a "silo" arrangement or framework. The sensors in the devices that are scanning can connect to the beacons.

At step 604 the beacon 1102 receives 1114 a request from the device. The app is able to either recognize the request or not. If it does not recognize the request from the device 1104 or has not seen a request from the device 1104 for a long time (a time exceeding a predetermined threshold), control goes to step 606. In various embodiments, device 1104 may determine whether a session is active based upon identifying information from user device 1102. For example, device 1104 may determine whether portions of the ephemeral ID 1112 are cached within device 1104. The ephemeral ID may be cached by device 1104 in step 614, described below, when a session is initiated.

In some embodiments, if there is no active session, the app requests 1116 a non-repeatable value or nonce from the device and a fixed unique ID for that device. In some embodiments, the nonce may be random data, pseudo random data, or data selected from a predetermined set of data. In other embodiments, this ID can come from the service provider server or through other means, such as through an ID tag via near-field communication or an iBeacon associated with the device. In other embodiments, in response to the transmission 1112 of the ephemeral ID, reader 1104 may provide 1118 the identifiers. At step 606 the app receives 1118 these values. At step 608 the app 1102 connects to the service provider server 1106 and transmits 1128 these two values to the server 1106. In various embodiments, transmissions between user device 1102 and server 1106 are typically rf communication using Wi-Fi, cellular service (e.g. 4G, 5G, etc.), or the like.

In some embodiments, assuming the server 1106 is able to identify the unique ID as belonging to the device 1104, and assuming the user of device 1102 is authorized, server 1106 grants access between the device 1104 and the beacon 1102. The server 1106 uses the nonce for deriving a token as described below. More specifically, it enables access control and security by transmitting 1120 an array of tokens to the smart phone 1102. the server 1106 cannot recognize the device from the ID or determines that there is no interest from the user in accessing or interacting with the device, then tokens are not passed to the smartphone. In some cases, metadata may be passed 1122 to the smartphone which provides publicly available, insecure information related to the device such that the user can act on the information (e.g. options). For example, the device 1104 may be a public device, such as a kiosk or parking meter, and although most of the time the user is likely to ignore the device, if the user wants to learn more about the device (e.g., remaining parking time or rate), the user would be able to do so with the data returned by the dedicated server. In one embodiment, a token has one component that is derived from combining the nonce, the unique device ID, device-specific data, time-limited data, user restrictions, and so on. In one aspect of the present invention that communications between the device 1104 and user 1102 be secure. All the values and factors that go into making the token play a critical role in making the entire universal ID signal framework secure.

The second component of a single token is referred to as a payload section and contains data on user preferences and generally to the user and device. In one embodiment, each token in the array is valid for a limited time period, such as for a few minutes, hours, or days. An array may have a few hundred tokens and can be used to prove validity from a few hours to several days. For example, for commercial building access, a token may last for 4-5 hours and be replenished often to ensure that there are tokens to last the user through the day.

In another embodiment, where access to a service provider server may not be available, tokens can be generated on a device, such as a lock, using other factors, such as biometrics fingerprint, voice recognition, face recognition or retina scanner part of the device, geo-location, expiration time, and so on. These features can also be used even if there is access to the service provider server to provide stronger security. As is known in the art, a token is a signed data item, intended to be used once and discarded (as does an entire array of tokens). Getting back to the importance of security in a universal ID signal framework, the array of tokens that is sent 1120 from the service provider server 1106 to the smart phone 1102, together with other security features, prevents possible hacking and malfeasance, for instance, "replaying" or emulation (harmful devices emulating valid, authorized devices), among others.

At step 612 the app passes 1124 one of the tokens from the array or the entire array of tokens to the device 1104. In some embodiments, the token may pass 1124 via BLE, and in other embodiments, the token may pass via other channel (e.g. NFC, or the like). The device validates the tokens and interactions between the user and the device can begin. More specifically, the universal ID signal software module on the device 1104 validates the tokens and sends 1126 a message to the smart phone stating that they can now communicate. Upon receiving this message, at step 614 the beacon creates a session and the two can now interact. As disclosed above in FIG. 10, the session may include communicating options available, receiving user selections, and the like.

Returning to step 604, if the beacon 1102 app recognizes the request 1114 from the device 1104, control continues with step 616 where a session between the smartphone and the device is already active. As discussed above, determining whether a session is active may be performed based upon cached data within device 1104 (e.g. another token, a MAC address of user device 1102), the ephemeral ID 1112 provided by user device 1102, a challenge and response between device 1104 and user device 1102 based upon a key from a token, or the like. This session may be the same type as the one created at step 614.

The array of tokens may be stored in a cache or local storage on the smartphone. By doing so, the smartphone 1102 does not have to be online; it can be offline and operate fast. At step 618 the smartphone continues passing 1124 tokens to the device. The smartphone keeps the tokens for a predetermined amount of time, a threshold of time that balances security and user convenience, for example, a few hours. After that time has expired, the app on smart phone 1102 gets a new array of tokens from the service provider 1106. If they have not expired, the smartphone can keep using the tokens in the array. At step 620 the interaction between the user 1102 and the device 1104 can resume. In this manner, that is by executing the operations in steps 604 to 614 or steps 604, 616, 618, and 620, a secure, truly universal ID signal that is usable by many different types of devices (from various manufacturers) and users can be implemented.

Figure 7:
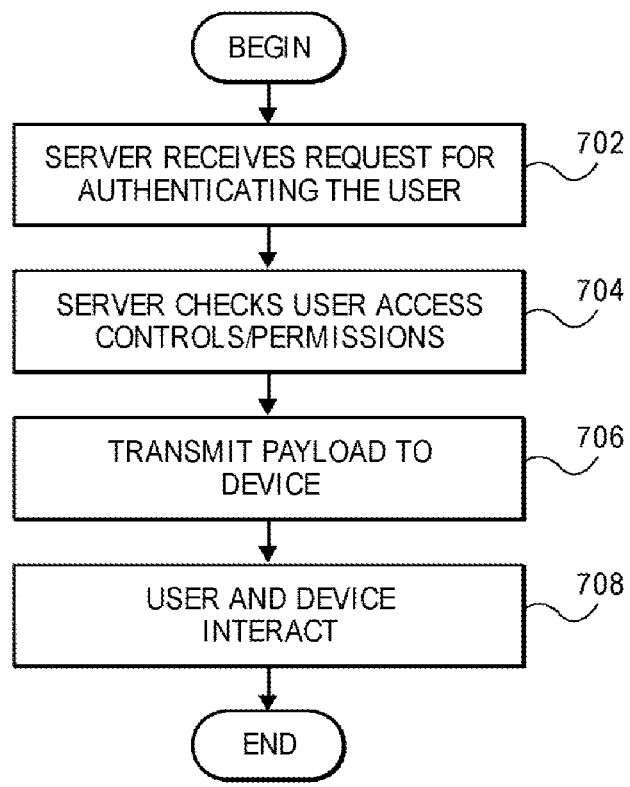
FIG. 7 is a flow diagram of a process of operations that occur on the device when the device is online in accordance with some embodiments.

FIG. 7 is a flow diagram of a process of operations that occur on the device 1104 when the device 1104 is online in accordance with one embodiment. At step 702 the service provider server 1106 receives a request 1130 from a device, for example a car or an appliance, for authenticating a user 1102. It is helpful to note that a device 1104 can only see users who have allowed that specific device to recognize or see them (a category of devices or a specific manufacturer or member group may also be specified). Similarly, in some physical environments, such as a workplace or other secured area, a user is only allowed to see devices that an overseeing entity (e.g., employer) says she is allowed to see or recognize. Such embodiments may be based upon identifiers that are transmitted 1118. If the user device 1102 is not allowed to recognize a reader 1104, based upon the reader's identifiers, the communication may terminate. In other contexts, a device maker may only want users with certain features or characteristics to be able to see or recognize its devices. Various types of scenarios are possible in which either the user or the device maker or owner, manager, and the like can set security protocols regarding who or what can be recognized using the universal ID signal. For example, one benefit of this type of security is that it prevents the equivalent of spamming on both sides. In all scenarios, the underlying security principle that is implemented in the various embodiments of the invention is that either side—user or device— only gets to see and receive what it needs to in order to interact and can only get to that point if the user or device is authorized to see the other. At step 704 the service provider server checks user access controls to see if the user is authorized to use the device and if so what controls or limits are there. There are different techniques or transport mechanisms for how this user access control check can be performed by the service provider. For example, in one embodiment, there may be an out-of-band token exchange or a token server. The common factor is translating the random, non-identifying ID (e.g. ephemeral ID) for the user that was transmitted 1112 initially to the device 1104 into a full set of information about the user. This information can be used in a permission check process. At step 706, assuming the user is authenticated, the service provider server transmits 1132 the payload to the device 1104 so now the device knows the user's preferences, permissions, interaction history, and other information. At step 708 the user 1102 and device 1104 can begin substantive interaction.

Figure 8:
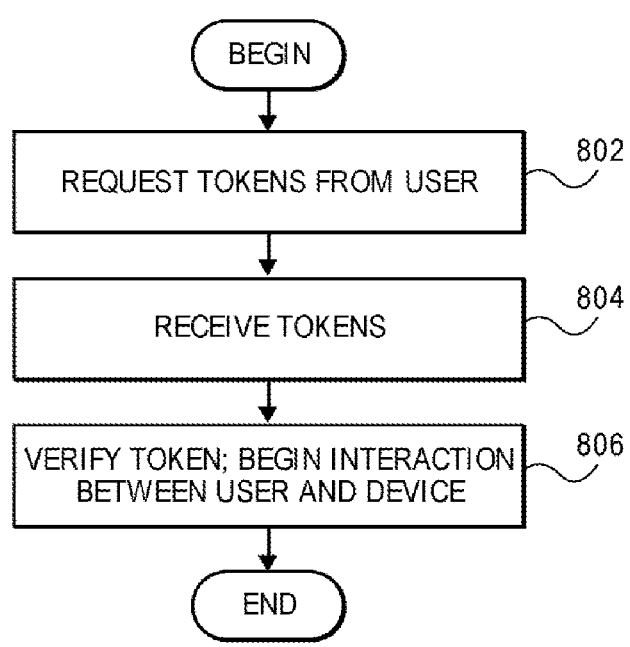
FIG. 8 is a flow diagram of a process that occurs on the device when the device is offline in accordance with some embodiments.

FIG. 8 is a flow diagram of a process that occurs on the device when the device is offline in accordance with one embodiment. The end goal of this process is essentially the same as that of FIG. 7, except here the device 1104 does not communicate with the service provider server 1108. At step 802 the device makes a request 1114 for an array of tokens from the user. The nature and characteristics of this array of tokens are the same as the token array described above. At step 804 the device 1104 receives 1124 a token from the beacon 1102. At step 806 the device 1104 proceeds with verifying the token using only local resources. In various embodiments, it can verify or check the signature in the tokens, it can check to ensure it has not expired or has not been used before. Through these means and others, if available locally, the device authenticates the user and interaction between the user (who may or may not be online) and the offline device can begin. As discussed above, this may include providing 1134 payload data associated with the user and user device 1102, (e.g. a persistent ID, an employee badge number, a store loyalty card, an account number, a stored-value card number, a credit or debit card, telephone number, email address, etc.) that is stored within the token to back-end server 1110.

As noted above, with regard to security, one notable aspect of that is embedded in the validation period of a token. This period can vary from a few minutes to several weeks. A token for a coffee machine may last 20 days whereas for a lock or for making payments, a token may expire after one hour. This security feature is typically set by the device manufacturer; they decide how long to wait before a user has to re-authenticate with the device. Generally, users will have little input in this regard. Another scenario not described in FIGS. 7 and 8 is when the device 1104 and smartphone 1102 are both unable to reach a service provider 1106 or dedicated server and have not connected or interacted with each other before. In this scenario, even though the smartphone has the universal ID signal app and the device registered with the service provider, there is no recognition of each other, let alone any interaction.

In various embodiments, if a back-end server 1110 is used, as described above, options may be provided 1104 to device 1104 and to smart phone 1102, and in response back-end server 110 may receive 1138 a user selection of an option. Back-end server 1110 may then instruct or cause 1140 peripheral device 1108 to perform an action for the user, as discussed above, such as to unlock a door, control a television, provide a product (e.g. a vending machine), etc. In other embodiments, if a back-end server 1110 is not used, device 1104 may directly instruct 1150 peripheral device to perform the action.

Figure 9:
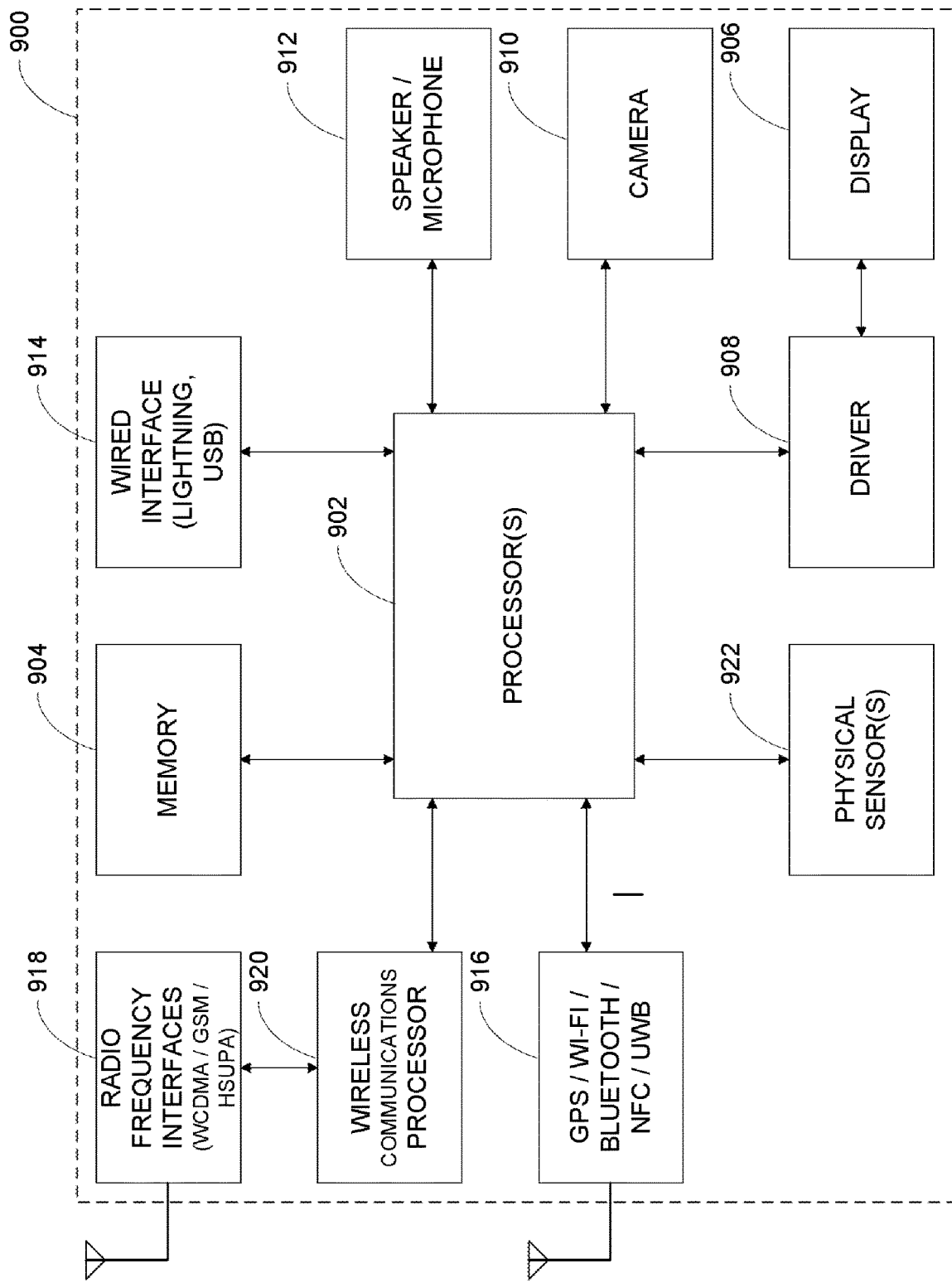
FIG. 9 is a block diagram illustrating an example of a computer system capable of implementing various processes in some embodiments.

FIG. 9 illustrates a functional block diagram of various embodiments of the present invention. More specifically, a user smart device and cloud-based servers may be implemented with a subset or superset of the below illustrated components. In FIG. 9, a computing device 900 typically includes an applications processor 902, memory 904, a display 906 (e.g. touch screen) and driver 908, an image acquisition device 910, audio input/output devices 912, and the like. Additional communications from and to computing device are typically provided by via a wired interface 914, a GPS/Wi-Fi/Bluetooth interface/UWB 916, RF interfaces 918 and driver 920, and the like. Also included in some embodiments are physical sensors 922 (e.g. MEMS-based accelerometers, gyros, etc.).

In various embodiments, computing device 900 may be a hand-held computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin, Motiv or the like); a headset (e.g. Oculus Rift, HTC Vive, Sony PlaystationVR); a wearable device (e.g. Motiv smart ring, smart headphones); or the like. Typically, computing device 900 may include one or more processors 902. Such processors 902 may also be termed application processors, and may include a processor core, a video/graphics core, and other cores. Processors 902 may be a processor from Apple (A11, A12), NVidia (Tegra), Intel (Core), Qualcomm (Snapdragon), Samsung (Exynos), or the like. It is contemplated that other existing and/or later-developed processors may be used in various embodiments of the present invention.

In various embodiments, memory 904 may include different types of memory (including memory controllers), such as flash memory (e.g. NOR, NAND), SRAM, DDR SDRAM, or the like. Memory 904 may be fixed within computing device 900 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. It is contemplated that other existing and/or later-developed memory and memory technology may be used in various embodiments of the present invention.

In various embodiments, touch screen display 906 and driver 908 may be based upon a variety of later-developed or current touch screen technology including resistive displays, capacitive displays, optical sensor displays, electromagnetic resonance, or the like. Additionally, touch screen display 906 may include single touch or multiple-touch sensing capability. Any later-developed or conventional output display technology may be used for the output display, such as IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 906 may be integrated into computing device 900 or may be separate.

In some embodiments of the present invention, image capture device 910 may include one or more sensors, drivers, lenses and the like. The sensors may be visible light, infrared, and/or UV sensitive sensors that are based upon any later-developed or convention sensor technology, such as CMOS, CCD, or the like. In various embodiments of the present invention, image recognition software programs are provided to process the image data. For example, such software may provide functionality such as: facial recognition (e.g. Face ID, head tracking, camera parameter control, or the like. In various embodiments of the present invention, image capture device 910 may provide user input data in the form of a selfie, biometric data, or the like.

In various embodiments, audio input/output 912 may include conventional microphone(s)/speakers. In various embodiments, voice processing and/or recognition software may be provided to applications processor 902 to enable the user to operate computing device 900 by stating voice commands. In various embodiments of the present invention, audio input 912 may provide user input data in the form of a spoken word or phrase, or the like, as described above. In some embodiments, audio input/output 912 may be integrated into computing device 900 or may be separate.

In various embodiments, wired interface 914 may be used to provide data transfers between computing device 900 and an external source, such as a computer, a remote server, a storage network, another computing device 900, a client device, or the like. Embodiments may include any later-developed or conventional physical interface/protocol, such as: USB, micro USB, mini USB, Firewire, Apple Lightning connector, Ethernet, POTS, or the like. Additionally, software that enables communications over such networks is typically provided.

In various embodiments, a wireless interface 916 may also be provided to provide wireless data transfers between computing device 900 and external sources, such as computers, storage networks, headphones, microphones, cameras, or the like. As illustrated in FIG. 9, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), mesh communications, and the like.

GPS receiving capability may also be included in various embodiments of the present invention. As illustrated in FIG. 9, GPS functionality is included as part of wireless interface 916 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces 918 and drivers 920 in various embodiments. In various embodiments, RF interfaces 918 may support any future-developed or conventional radio frequency communications protocol, such as CDMA-based protocols (e.g. WCDMA), GSM-based protocols, HSUPA-based protocols, G4, G5, or the like. In the embodiments illustrated, driver 920 is illustrated as being distinct from applications processor 902. However, in some embodiments, these functionality are provided upon a single IC package, for example the Marvel PXA330 processor, and the like. It is contemplated that some embodiments of computing device 900 need not include the wide area RF functionality provided by RF interface 918 and driver 920.

In various embodiments, any number of future developed or current operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to touch screen display 906 and driver 908 and inputs/or outputs to physical sensors 810 may be processed in parallel processing threads. In other embodiments, such events or outputs may be processed serially, or the like. Inputs and outputs from other functional blocks may also be processed in parallel or serially, in other embodiments of the present invention, such as image acquisition device 910 and physical sensors 922.

FIG. 9 is representative of one computing device 900 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 9. For example, a smart phone configured to perform may of the functions described above includes most if not all of the illustrated functionality. As another example, a biometric acquisition device, e.g. a smart ring, may include some of the functional blocks in FIG. 9, it need not include a high-resolution display 930 or touch screen driver 940, a camera 950, a speaker/microphone 960, wired interfaces 970, or the like. In still other embodiments, a cloud-based server may not include image acquisition device 912, MEMs devices 922, a touchscreen display 906, and the like.

Figure 12:
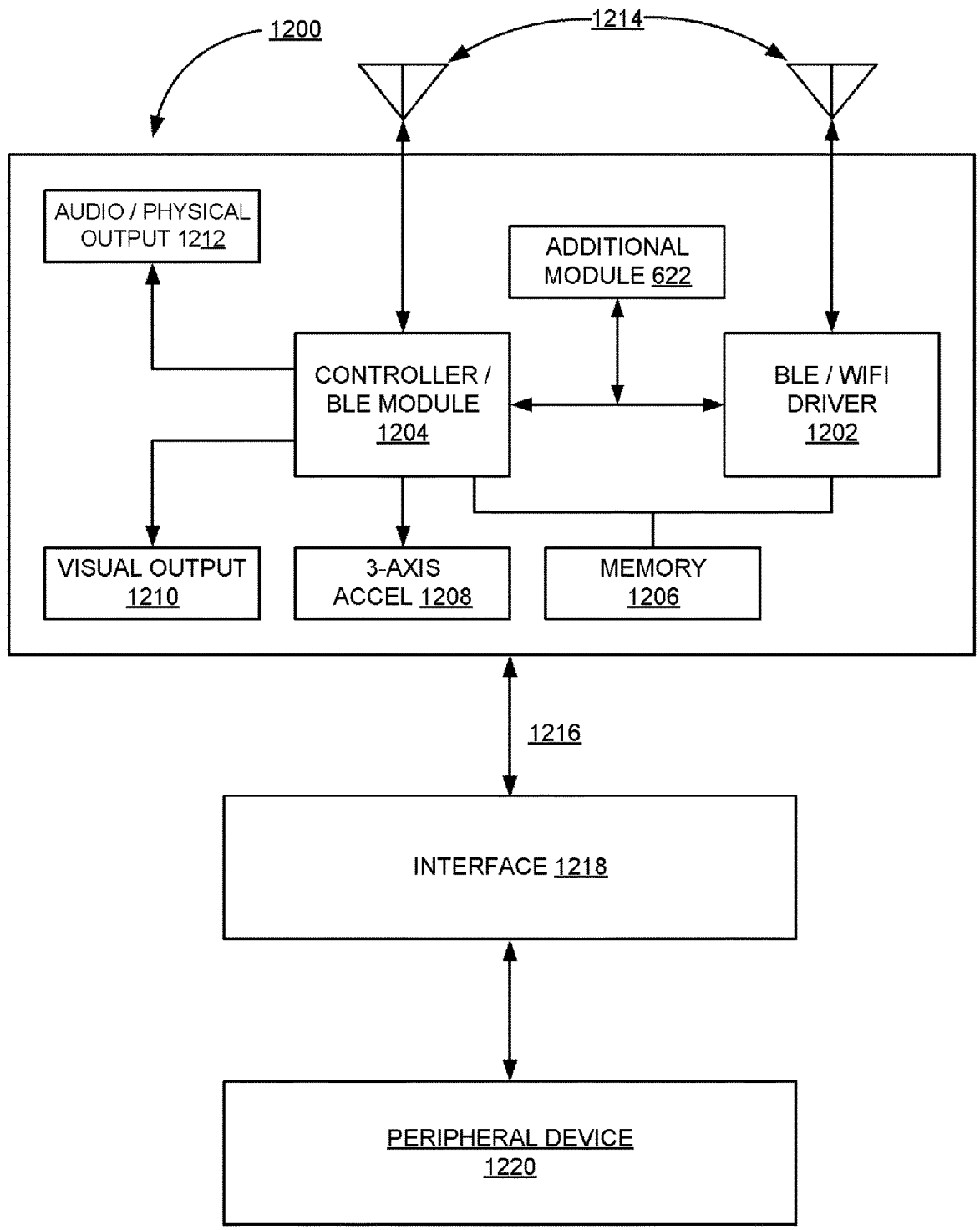
FIG. 12 is another block diagram of a reader according to various embodiments of the present invention.

FIG. 12 illustrates a block diagram according to some embodiments of the present invention. More specifically, FIG. 12 illustrates a block diagram of a reader device 1200 described herein and illustrated as reader 1104 and 1104 in FIGS. 11 and 12. In some embodiments, device 1200 includes an rf control module 1202, a controller 1204, memory 1206, an accelerometer 1208, visual/haptic output 1210, audio output 1212, antennas 1214, interface bus 1216, and an interface module 1218.

In some embodiments, controller 1204 may be embodied as a Nordic nRF52832 system on a chip, suitable for controlling Bluetooth low energy (BLE) communications and for performing various functionalities described herein. Controller 1204 may include a processor, such as a 32-bit ARM® Cortex®-M4F CPU and include 512 kB to 124 kB RAM. In various embodiments, other types of SoC controllers may also be used, such as Blue Gecko from Silicon Labs, CC2508 from TI, or the like. Controller 1202 may be embodied as a muRata 1LD Wi-Fi/BLE module, suitable for controlling Bluetooth low energy (BLE) and Wi-Fi communications. Controller 1202 may include a processor, such as a 32-bit ARM® Cortex®-M4. In various embodiments, other types of controllers may also be used, such as CYW43012 from Cypress, or the like. In some embodiments, modules 1202 and 1204 enable communication via short range communications protocols, such as BLE, Zigbee, or the like. Modules 1202 and 1204 may also support mesh networking via BLE, Wi-Fi 12, or the like. In some embodiments, module 1202 also supports Wi-Fi communications to communicate over a wide-area network (e.g. Internet).

In various embodiments, memory 1206 may include non-volatile memory storing embodiments of the executable software code described herein. In some embodiments, the memory may be SRAM, Flash memory, or the like. In FIG. 12, audio/haptic output 1212 is provided to give a visitor with audio feedback or haptic feedback and visual output 1202 is provided to give a visitor visual feedback in response to the visitor approaching reader device 1200. In some embodiments, visual output 1202 may be one or more LED lights having different colored outputs, may be a status display panel. The feedback may be provided to the visitor based upon the visitor's security application running upon the smart device and interacting with reader device 1200. For example, if the smart device does not have the proper credentials for reader device 1200, a harsh buzzing sound may be played by audio output 1210, and a red flashing light may be output by visual output 1210; if the smart device is authenticated with reader device 1200, a bell ding sound may be played and the text "OK" may be displayed on a display; if the smart device is not authenticated with reader device 1200, an audio message and textual message may be output: "Not authenticated. For access, please call" or the like.

Accelerometer 1228 is provided in some embodiments to determine whether reader device 1200 is tampered with. For example, after installed and operable on a mounting location (e.g. on a wall), accelerometer 1228 monitors the orientation of accelerometer 1228 with respect to gravity. If a party attempts to remove reader device 1200 from a mounting surface, accelerometer 1228 will be able to sense the change in orientation. Based upon the change in orientation exceeding a threshold, a number of actions may be taken by reader device 1200. One action may be to cease operation of reader device 1200, another action may be to alert a remote server of the tampering, and the like. In other embodiments, other physical sensors, e.g. pressure sensors, light sensors, gyroscopes, and the like may be used. Such embodiments may also provide tamper detection indication.

In FIG. 12, interface 1216 is used to couple reader device 1200 to interface module 1218. In various embodiments, interface module 1218 interfaces with any number of external functional modules. In one configuration, an external functional module 1220 may be a peripheral device under control, e.g. an electronically controlled door latch, a television, a vending machine, a computer, an electronic panel, an automobile, a kiosk or the like; in another configuration, external functional module 1220 may be an existing module that is configured to read conventional low frequency or high frequency (LF/HF/UHF/etc.) based proximity cards or badges; and the like. In some embodiments, external reader module 1220 may be an existing reader mounted upon a wall, or the like. In some embodiments, interface 1216 may provide power to reader module 1200, interface 1216 may transmit data from reader device 1200 to interface module 1218 (e.g. credentials), provide power or the like.

In one configuration, rf control module 1202 is not used, and only one BLE antenna 1214 is provided; in another configuration, modules 1202 and 1204 are both used, and two BLE antennas 1214 are used (one specifically for scanning for ephemeral IDs within a geographic region and one specifically for handling communications with a smart device). Such embodiments are particularly useful in high volume situations wherein one BLE antenna may receive ephemeral IDs from many different smart devices (e.g. 12 users walking down a hall near a security door or vending machine), whereas the other BLE antenna will provide the credentials and receive tokens from the specific users' smart phones who want to interact with the reader (e.g. to enter the security door, to receive a good, to access a computer or the like). In other embodiments, other channels may be used to provide the above communications, such as short-range Wi-Fi, Zigbee, NFC, ANT, or the like.

In still another configuration, additional modules 1222 may be provided to add additional functionality to reader module 1200. In some embodiments, module 1222 may be an rf encoding module that converts data associated with the user (e.g. a badge number) into a format (e.g. LF/HF/UHF badge or tag) that is readable by a conventional RFID card or badge reader. In some embodiments, module 1222 may include one or biometric capture devices that capture biometric data of a user associated with a smart device. In some embodiments, biometric data may include facial data, voice data, eye data (e.g. iris, retina, blood vessel), print data (e.g. fingerprints, palm print, blood vessel), movement data (e.g. signature, movement, gait), and the like that may be used to facilitate authentication of the visitor.

In one embodiment systems and methods are provided for universal presence detection and interactions. As a non-limiting example, the universal ID signal is created that represents clients, people or other objects hereafter "first party" where any system, sensor or software can detect that signal and queries it for relevant information for serving the person or object. As a non-limiting example this entails a method of turning mobile devices, wearables or biochips and the like hereafter "device" into a personal transponder (e.g. transceiver) that emits a unique signal via Bluetooth low energy as in one instance to represent the presence of the person, e.g., user. Things around the user can detect the signal and can transform the signal into a meaningful metadata that represents the person or object of the signal.

In one embodiment systems and methods are provided for instant execution of actions through wireless connections. As a non-limiting example this incorporates a peripheral and central mode of operation is used to obtain a token. The token is only executed when it is within a threshold to make for an instant action. By scanning the address or other identifier of the device, and keeping a token cached locally in the embedded system, the embedded system can then act instantly on any command/intent that the mobile client triggers such that there is no lag between the intent and the performed action.

In one embodiment systems and methods are provided for sensing the presence of identifiable objects. As a non-limiting sensor technology is used that scans and primes objects nearby which emits a unique universal ID signal. As a non-limiting example, the sensor can trigger an emitter to provide specific information about it or the emitter of the presence universal ID signal can detect the scanner and do the same. In this embodiment systems and methods are provided of turning a sensor into both a peripheral and central device for the purposes of detecting the presence of objects nearby. This can be used to securely make the handshake and reduce the load on the first party by using the scanner on the sensor to do most of the hard work to not overload the peripheral modes.

In another embodiment systems and methods are provided for passive detection and identification of passengers, first party, on a moving vehicle. As a non-limiting example this can include use of an accelerometer and a signaling protocol to conclude that the object being sensed is in fact travelling with the vehicle that the sensor is attached to. Steps are taken with the universal ID signal and shares commands between the sensor the passenger to trigger a confirmation that the passenger is travelling on the vehicle. The main use case is to sense when people are travelling on a bus or train and to be able to do things such as process payments for the traveler automatically or to track the passenger's route.

In another embodiment systems and methods are provided to secure offline interactions. As a non-limiting example, a method is provided for collecting a plurality of commands on the first party and a bloom filter is used on the sensor side to certify a secure command through BLE (Bluetooth low energy) has happened without any fall back over the internet. As a non-limiting example this method can be used to issue any type of command, including but not limited to payments, metadata, and the like, between things and a sensor with limited storage capacity within proximity without the need for an internet connection.

In another embodiment systems and methods are provided for secure physical payment processing over wireless local networks. As a non-limiting example, a method of handshaking the connection to a POS/terminal and the first party's mobile device is used where both sides are securely verified. Once an amount is entered in a terminal and applied to the detected entity the payment is batched and processed on the back end. In this manner there is no exchange of payment information between the terminal and the first party for a safer and secure payment process. In this embodiment the system defines that things are done in a unique way for anything which as non-limiting examples can be Google Hand's Free, Apple Pay and the like.

In one embodiment systems and methods are provided for wireless identification for connecting second party account services access via a proxy agent. As non-limiting examples the system and method allow devices to detect the first party and access first party accounts including but not limited to: Andorra, Netflix, one or more Calendars, an Amazon Account, and the like, through a proxy agent. As a non-limiting use case is the ability to walk up to any Echo like device and it instantly recognizes and can say "Hello first party X" and first party X can say to it "play my easy music station on Pandora", having never used the device before or having to set up first party X's specific account with the Echo device. This is an improvement over the need to set up an account and limit these devices to just the users with accounts set to them. Another use case is the ability to use any TV Screen and X's avatar shows. As non-limiting examples as first party X taps it all of its' Netflix shows, YouTube videos, and the like, show up for first party X and to instantly play it. As first party X walks away it all disappears. All of this exposes an oath to the Netflix account of first party X to the TV software to start playing it without forcing first party X to do another separated Netflix login on the TV.

As noted above, various embodiments may include detecting the number of people in a room or space, or whether someone just walked into a space. Based upon such capability, additional embodiments of the present invention may be directed to emergency situations where for safety's sake, users need to evacuate the location (e.g. building), users need to seek shelter indoors, or the like.

The tokenization protocol is useful in another environment or use case that can be described as time-sensitive and/or emergency response scenarios. Emergency response scenarios may occur in a number of situations. Unfortunately, two increasingly common ones are active shooter incidents and building fires. Many structures, whether high rises, office complexes, public or government buildings, schools, colleges, shopping malls, airports, and so on (collectively referred to herein as "building") may have sensors (e.g. reader devices) installed and strategically located throughout them. These sensors, cameras, readers, and so on can have multiple purposes. One of the main objectives in addressing and facilitating rescue operations or containing a situation is determining exactly where people are in a building, that is, their precise location on a floor, for example. Another feature that is important is sending customized and/or specific alerts based on who the recipient is and where they are located in the building. (There are commercially available rule engines that can generate the appropriate safety alert, instruction, message, etc. for a person given their specific location in a given emergency or time-sensitive situation, such as an active shooter or fire scenario.)

The tokenization protocol has specific features that greatly facilitate emergency and time-sensitive rescue efforts. An individual carrying a device executing the protocol app (e.g. security application from the assignee of the present disclosure) and emitting a universal signal is able to be identified by the system by their full name. This enables rescue personnel to specifically call out a person's name and provide instructions for that person. It also allows for specifically locating the person in a structure with high accuracy. The location feature may be enabled by coupling floor maps or other type of layout schematics (which includes exit routes, stairwells, fire doors, etc.) to the system.

In various embodiments, many buildings, offices, public spaces, malls, and so on may have sensors throughout them that are able to detect a beacon signal which, in turn, is regularly and constantly broadcasting signals. With the use of the tokenization signal and the system describe herein, this allows for 1) determining a specific individual by name, age, etc.; 2) precisely locating that person on a floor, which room, hallway, corridor, corner or section if in a larger open space; and 3) deriving specific instructions for that individual, who can be called by name, on exactly where to go to be safe. The instructions in item 3 may be push notifications from the system to the person's device which audibly or textually instruct the person, by name if needed, on exactly what to do. The content of the actual notification can be a combination of a message from the rules engine which determines what the alert should say (derived by experts and specialists in various emergency response situations) and what is known about the building (e.g., office, school, airport, to name a few examples). Finally, emergency response teams or first responders are able to determine if that individual has reached a safe area and, prior to that, they are able to determine how many people are still in a dangerous situation and how many were able to get to safety.

A system may include a location within a building, facility, school, area or the like including a number of reader devices according to various embodiments of the present invention. For example, reader devices may be a Mobile Reader Nano device or other product currently available by the assignee of the present invention. It is contemplated that the location of each of these reader/sensor devices is known a priori within the geographic area. For example, one reader may be located in each classroom in a school; one reader may be located at each exit of a factory; one reader may be located at information kiosks in an amusement park; or the like.

Figure 13A:
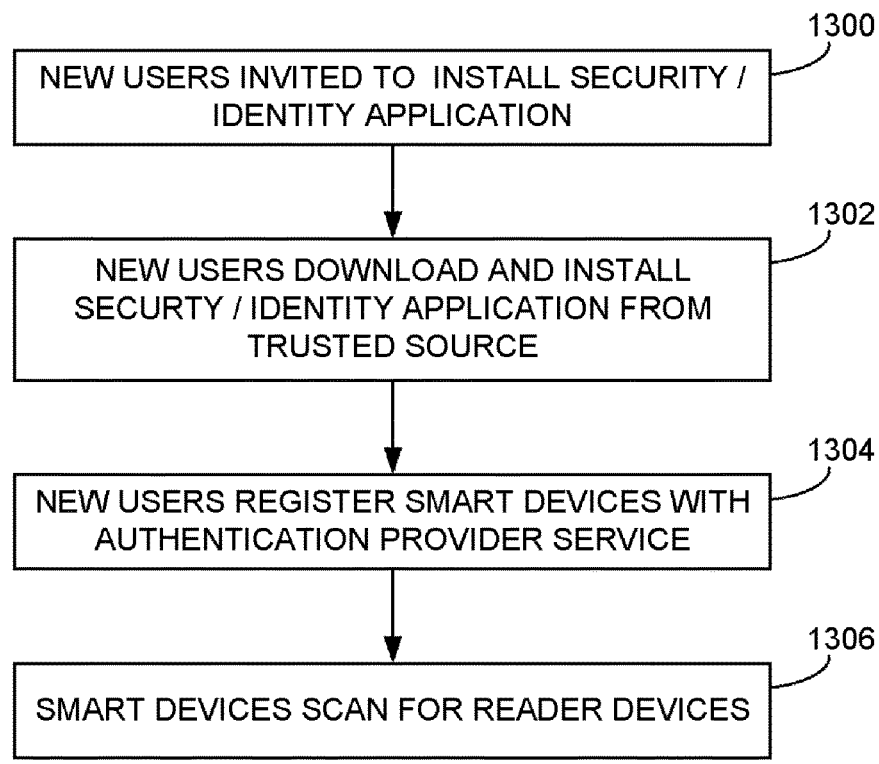
FIGS. 13A-E are flow diagrams of processes according to various embodiments.

FIG. 13A illustrates a flow diagram according to various embodiments. Initially, users register their smart devices to become authorized users. In various embodiments, to set-up authorized users, methods may include:

1. Authorized users being invited to install a security application upon a smart device, i.e. a smart phone, a smart wearable device, or the like, step 1300. For example, a new employee of a company may receive an e-mail invitation through their work e-mail address; a visitor to a resort may receive a text invitation to register with the resort; students may receive an e-mail indicating they should register their smart devices with the school; and the like. In various embodiments, the security application is associated with a cloud-based authentication system provided by the assignee of the present application. The company may also add the user's e-mail address, telephone number, social network address, student ID, or the like on an authorized user list within the authentication system.

In the case of a first responder, a similar process may be performed, inviting the first responder to install a program on their smart device.

2. Users download and install the security application upon the smart device from an application provider, e.g. AppStore, Google Play, or the like, step 1302. Next, running the security application, the users registers their smart devices with the authentication server (may be cloud-based) using, for example, their e-mail address, step 1304. In some embodiments, biometric verifications on the smart device may be used to ensure the registered owner of the smart device is the one installing the program.

In the case of a first responder, it is contemplated a high security application may be provided and installed onto the first responder's smart device. As will be described below, the functionality for the high security application may be similar to that described below, but may include additional features only available for the first responders. In some embodiments, the high security application may communicate with the authentication system e.g. FIG. 16, 1600 or to a local centralized server e.g. FIG. 16, 1662 that is described below.

3. After registration, the users' smartphones (e.g. 1606, 1608) may enter a short-range scanning mode, looking for communications from reader devices, described above, step 1306. Short-range communications may be provided via Bluetooth, UWB, ZigBee, Wi-Fi or the like.

In various embodiments, users who have installed the application, but have not registered may be considered unauthorized users, although their presence in the location may be acceptable.

Figure 13B:
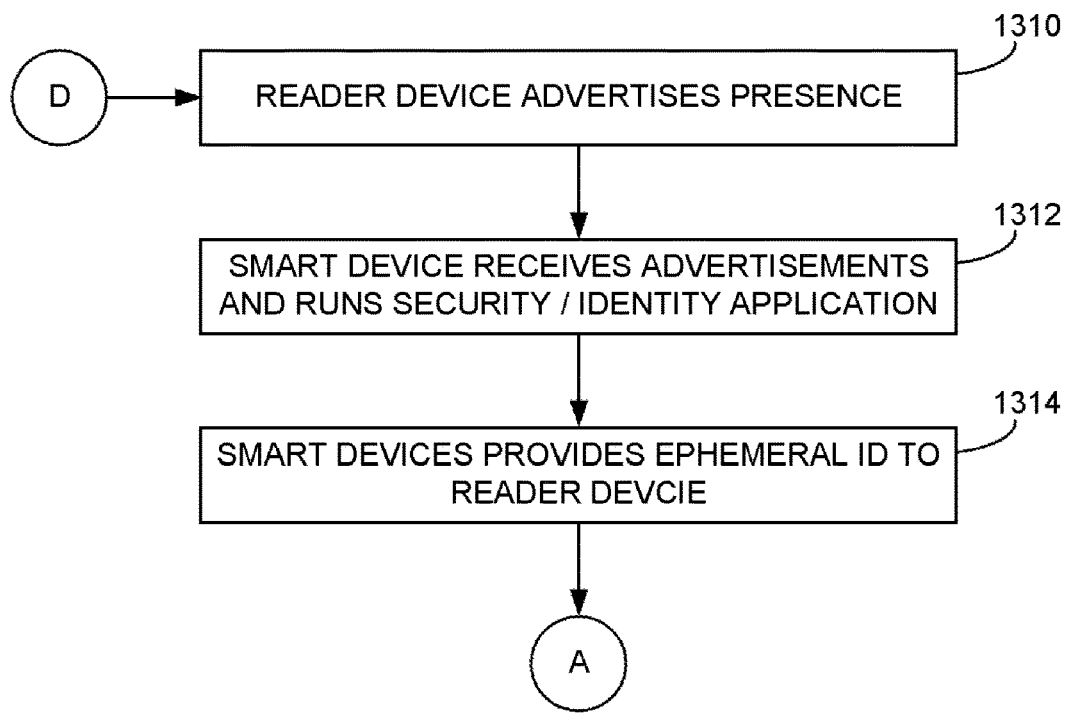
Figure 13C:
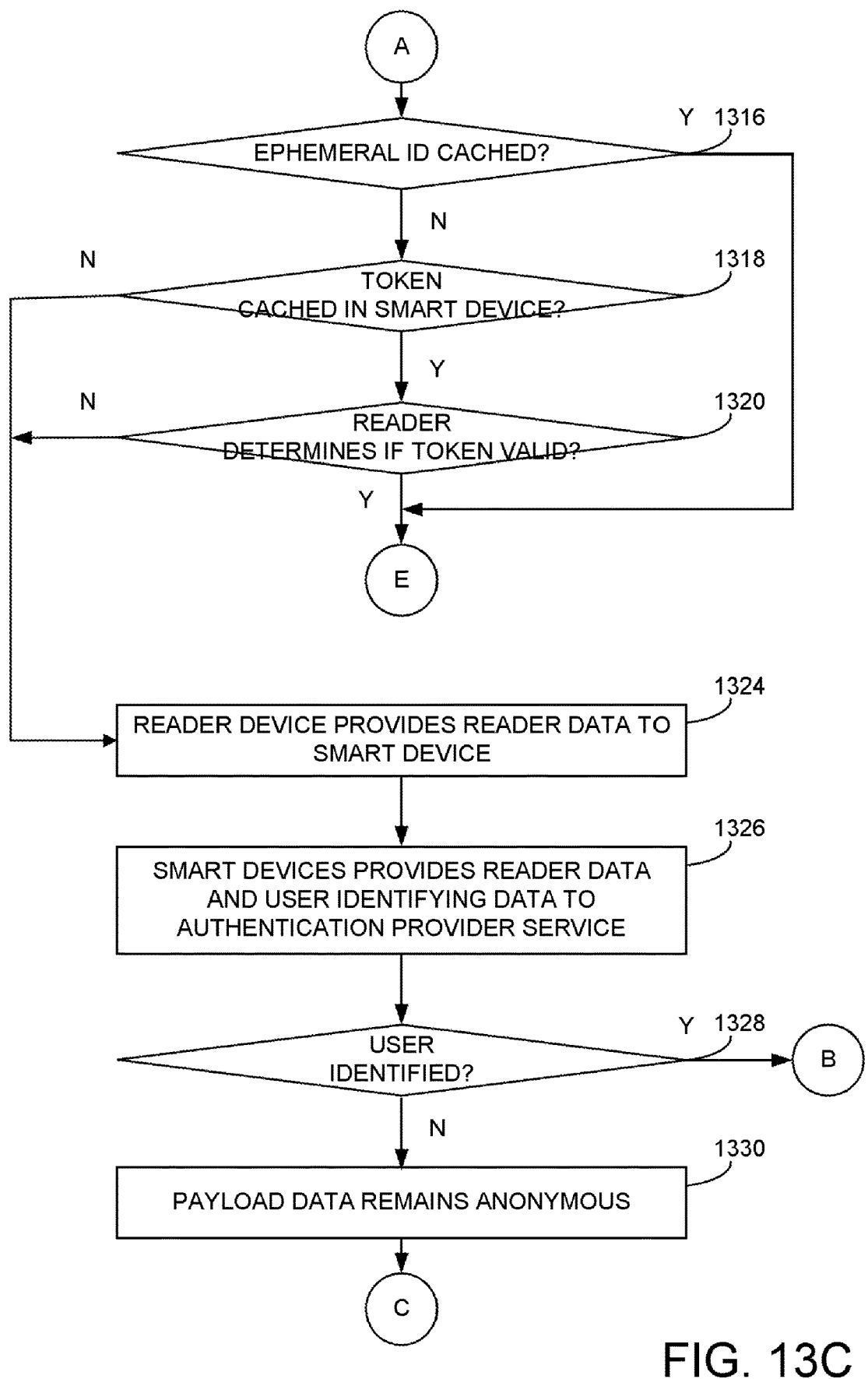
Figure 13D:
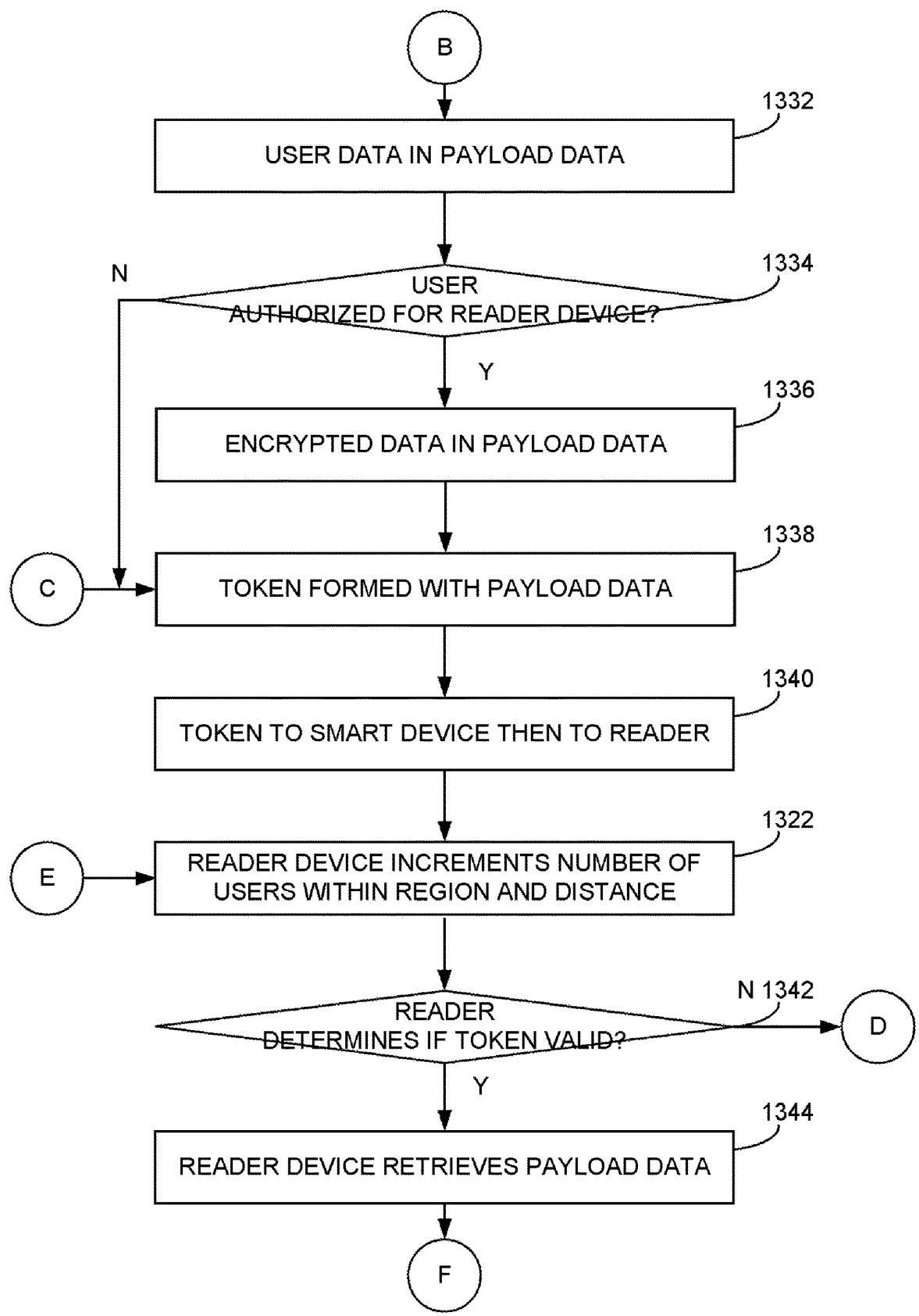
Figure 13E:
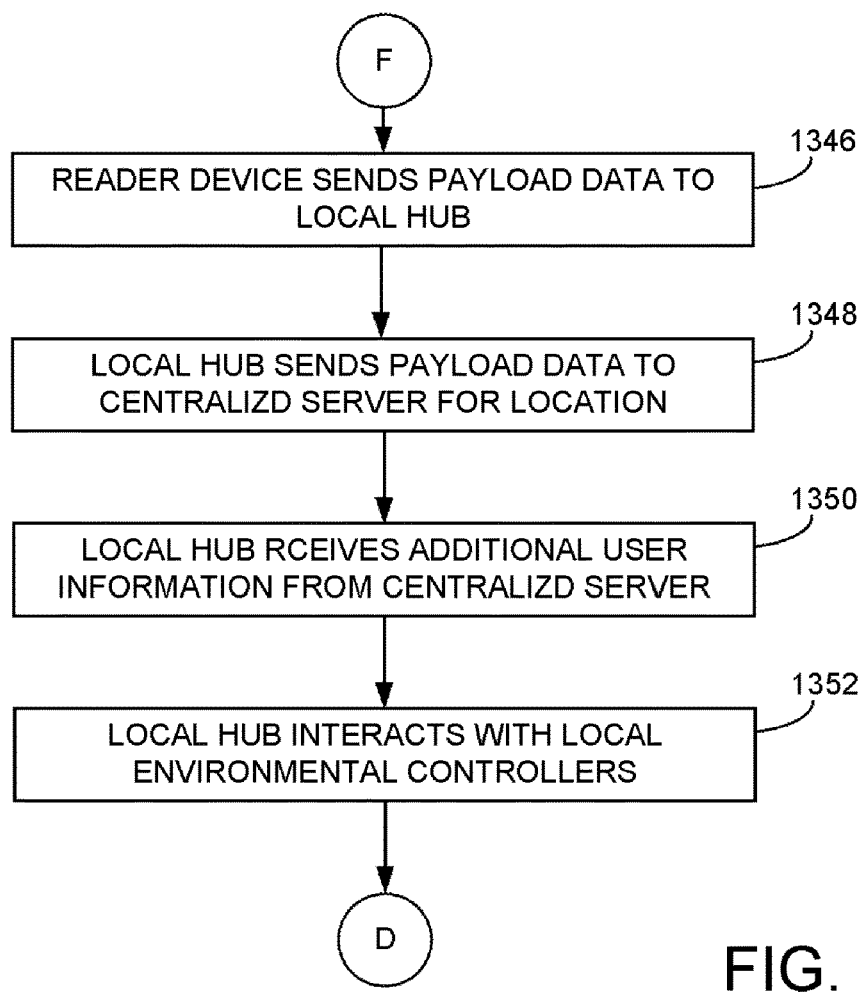
Figure 16:
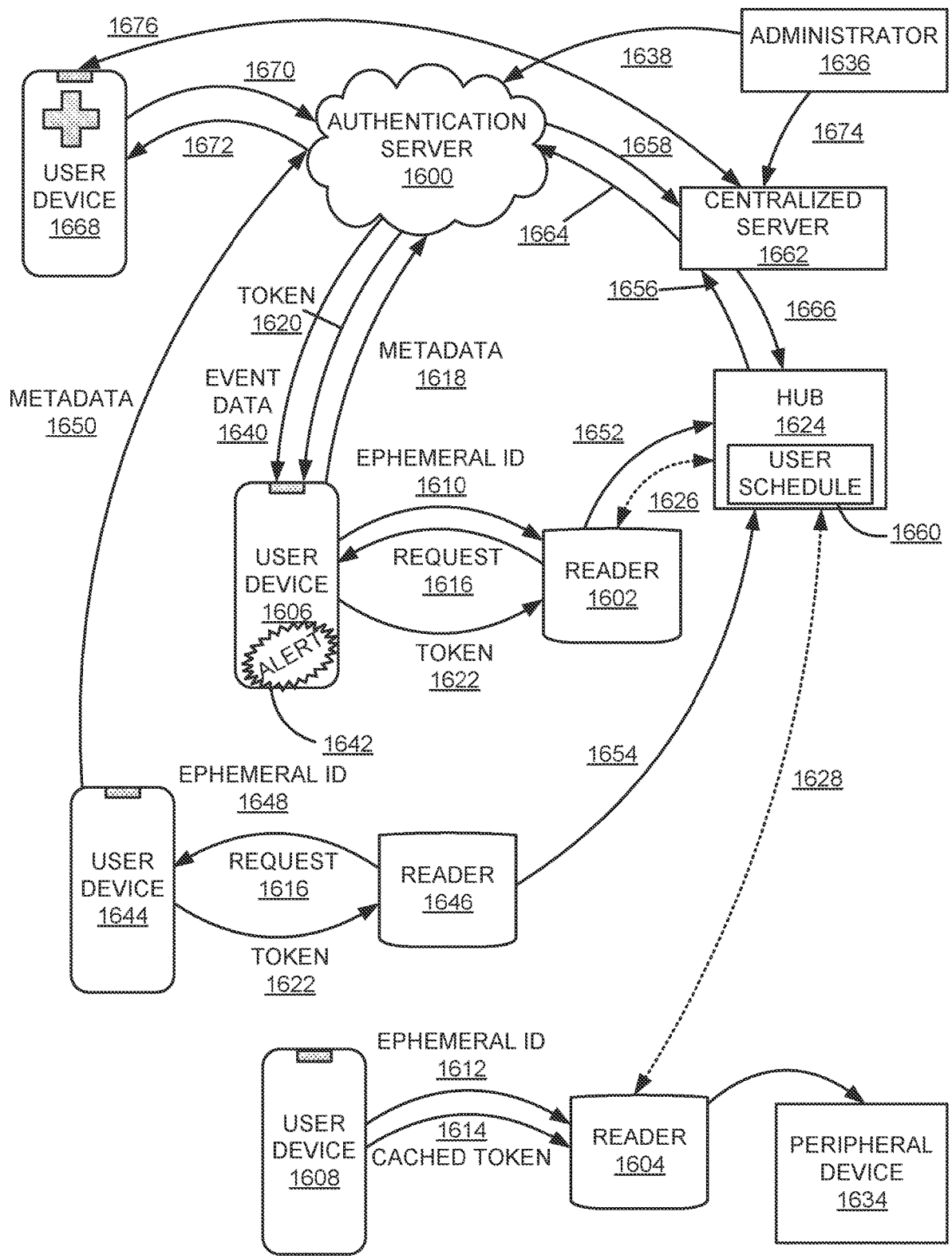
FIG. 16 is another lock diagram of a system according to various embodiments.

FIGS. 13B-D illustrate a flow diagram according to various embodiments that includes references to FIG. 16. In normal operation, within the location, to determine presence of users, the operation may include:

1. Reader devices 1602 and 1604 outputting short-range transmissions, step 1310. In various embodiments, the transmissions may include data identifying the readers 1602 and 1604 as being compatible with the security application and the cloud-based authentication system 1600. The identifications from each reader device are typically unique. As discussed above, the communications between the reader device and the smart phones may occur via Bluetooth, or the like.

2. In response to these transmissions, smart devices, e.g. 1606, 1608, that were registered with the authentication system may automatically run the security application, step 1312 and respond back to the reader devices it senses with transmissions including ephemeral IDs, e.g. 1610, 1612, step 1314. In some embodiments, the ephemeral IDs (e.g. MAC address) are output from a smart device regardless of whether the security application is running or installed. These ephemeral IDs are not permanently associated with the smart devices, and typically identify the smart devices to the reader device for a short period of time. In the case where the broadcast regions of two reader devices overlap and a user's smart device receives transmissions from both reader devices, the smart device may communicate with both reader devices in a time interleaved manner; may complete communicating with one reader device before communicating with the second reader; or the like.

3. Next, in some embodiments, a reader device, e.g. 1604, and the smart devices, e.g. 1608, determine whether the smart devices are already authenticated or whether sessions already exist between the smart devices and the reader device. In one embodiment, smart devices may have pre-cached tokens, e.g. 1614 (as will be described below), step 1318 that authorize the smart devices with respect to the reader device, step 1320. In other embodiments, a session may exist if the smart device has previously been authenticated with regards to the reader device. For example, if the smart device was paired to the reader device with a limited period of time ago, e.g. 1 hour, 6 hours, 12 hours, etc., the smart device can be re-authenticated without accessing the cloud-based authentication server 1600, authentication provider service, security service, etc. In some cases, the ephemeral ID of the smart devices as well as other previously provided payload data (e.g. name, picture, etc.) may be cached in the reader device and used later to quickly determine whether a session exists, step 1316. In other cases, the reader device and the smart device may use a challenge and response to determine whether a session exists, again, without accessing the cloud-based authentication server.

4. Next, for each session that exists between the reader device (e.g. 1604) and smart devices (e.g. 1608), the reader device may indicate the presence of an authorized user within a region about the reader device, step 1322.

5. For smart devices, e.g. 1606, that do not have a current session with the reader device, e.g. 1602, the reader device may provide the smart devices with reader identifying information and nonce data, e.g. 1616, or the like, step 1324. In various embodiments, the nonces for each smart device may be unique.

6. Smart devices that are not authenticated and receive the reader data may transmit 1618 this reader data, as well as user-identifiable information to the authentication server, e.g. 1600, step 1326. In some examples, the user-identifiable information may include the user's e-mail address, phone number, name, company name, a private key encrypted message, or the like. In various embodiments, these transmissions may be facilitated via Wi-Fi signals, cellular communications, G4, G5, rf, or the like.

7. In some embodiments, when the authentication server 1600 receives transmissions 1618 from the smart devices, e.g. user-identifiable information, ephemeral ID, reader identifier, nonce, etc., the authentication server determines whether the users of the smart device has previously registered with the server based upon the user-identifiable information, step 1328.

8. In response, the authentication server 1600 typically creates a unique token using the reader identifier and unique nonce for the specific smart device, step 1338. In some embodiments, the token, e.g. an encrypted message, may include a payload portion, step 1336 When the user is authorized or authenticated with the authentication server, step 1334, the payload may include user-identifiable information, e.g. an employee number, a badge number, a name, or the like, step 1332. When the user has not been authenticated with the authentication server, the payload may indicate an unknown user, or the like, step 1330.

9. In various embodiment, the tokens are sent back 1620 to the respective authenticated smart devices. Again, the communication is typically via a wide-area communications method.

10. In turn, the smart devices that receive tokens may save and/or send 1622 these tokens to the reader device 1602, typically via the short-range communications channels, step 1340.

11. The reader device 1602 determines whether each of the tokens it receives from the smart devices are authenticated, step 1342. In some embodiments, the tokens may include data from the authentication server 1600 that is encrypted using a private key of the authentication server or the like, and the reader device may use a public key of the authentication server to decrypt the data.

12. For each token that is authenticated, the reader device retrieves the payload data of identified users or unidentified users within the detecting region, step 1344.

13. The payload data of identified and unidentified users may then be sent to a local hub 1624, step 1346. In various embodiments, reader devices, e.g. 1602 and 1608, within a location or sub-location (e.g. meeting rooms) may be networked together, e.g. 1626 and 1628, to a local hub 1624 via Wi-Fi, Bluetooth, ZigBee, a mesh-network or other short-range communications. In some embodiments, the hub may be another smart device (e.g. tablet computer, laptop computer, or the like).

14. In turn, the local hub 1624 may communicate with a centralized server 1662 to indicate the presence of an identified or unidentified person within the vicinity of the specific reader device to the centralized server 1662, step 1348. Additionally, the local hub 1624 may retrieve additional information on identified users, e.g. a person's name, photograph, office location, and the like, step 1350. In various embodiments, the local hub 1630 may be coupled to the centralized server 1662 associated with the location via Wi-Fi, Ethernet, a mesh-network, or the like. In some cases, the local hub 1624 may already have additional information stored therein, accordingly, no real-time additional information on identified users is required from the centralized server 1662. In some embodiments, the centralized server 1662 may also control access control points (e.g. doors, elevators), alarms (e.g. fire), HVAC, and the like.

15. In some embodiments, the local hub 1624 may take any number of physical actions in response to detection of the presence of the identified users, step 1352, for example, if the reader device, e.g. 1602, is in a conference room, the local hub 1624 may connect a teleconference system to a meeting (e.g. Zoom conference) the user has previously arranged, the local hub 1624 may contact another user to notify the other user that the user has arrived, the lights and HVAC controls may be activated from a power-savings mode to an active mode, the local hub 1624 may indicate that the conference room is occupied in a reservation system, or the like; if the reader device is in an elevator, the local hub may automatically select a destination floor for the user based upon the user's needs (e.g. home floor, ground floor, visiting floor, or the like); if the reader device 1604 is in a hallway leading to another region, the local hub may unlock a door, a gate, or the like, turn-on lights and HVAC controls in the region, and the like, e.g. 1634. In light of the present disclosure, it is expected that one of ordinary skill in the art will recognize other types of physical actions that are considered within the scope of embodiments of the present invention.

16. In various embodiments, as the process above repeats continually, the presence of identified users and unidentified users relative to locations of reader devices can be maintained. Typically, the last place the user is sensed is used as the location of the user in the location. As an example, at 10 o'clock a user may be sensed in Conference room A, at 11 o'clock, the user may be sensed in the auditorium, at 1 o'clock the user may be sensed in the server room, and the like.

Figure 14A:
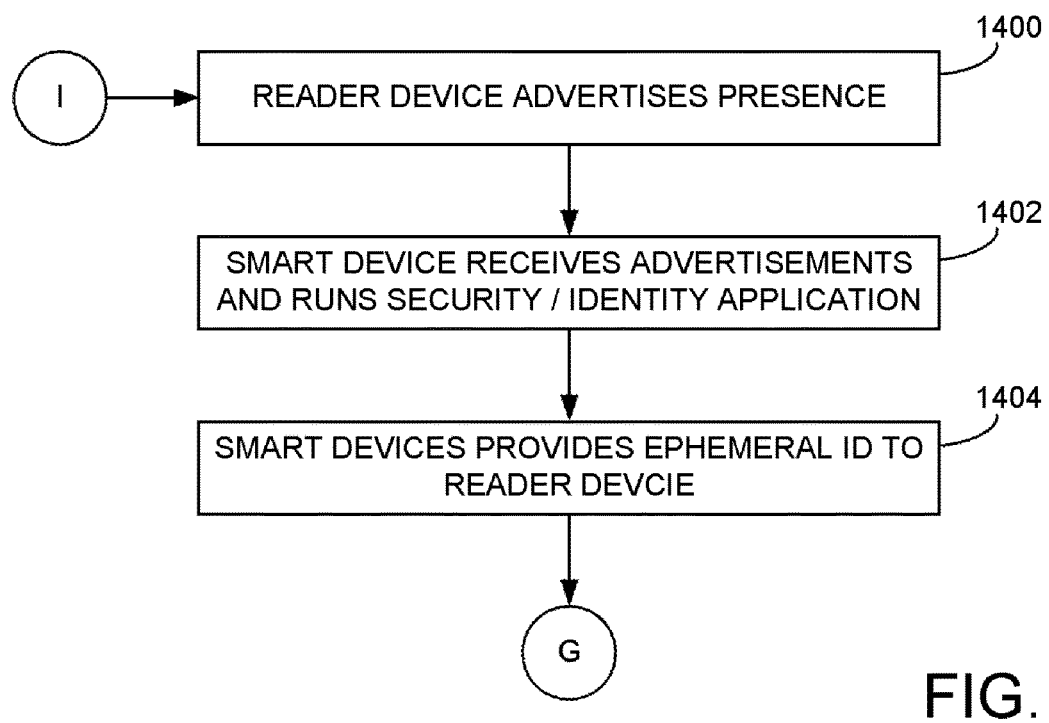
FIGS. 14A-C are flow diagrams of processes according to various embodiments.
Figure 14B:
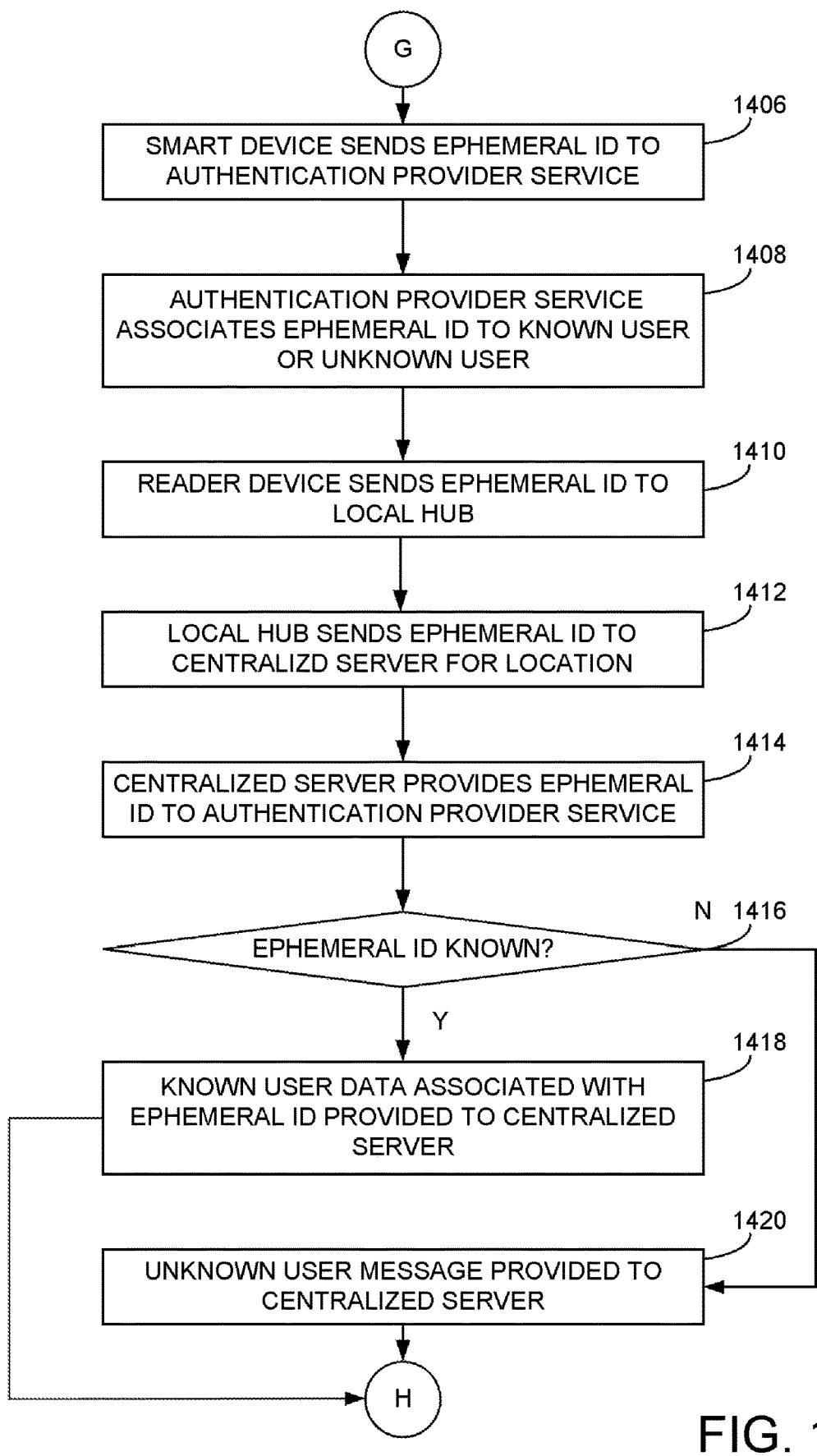
Figure 14C:
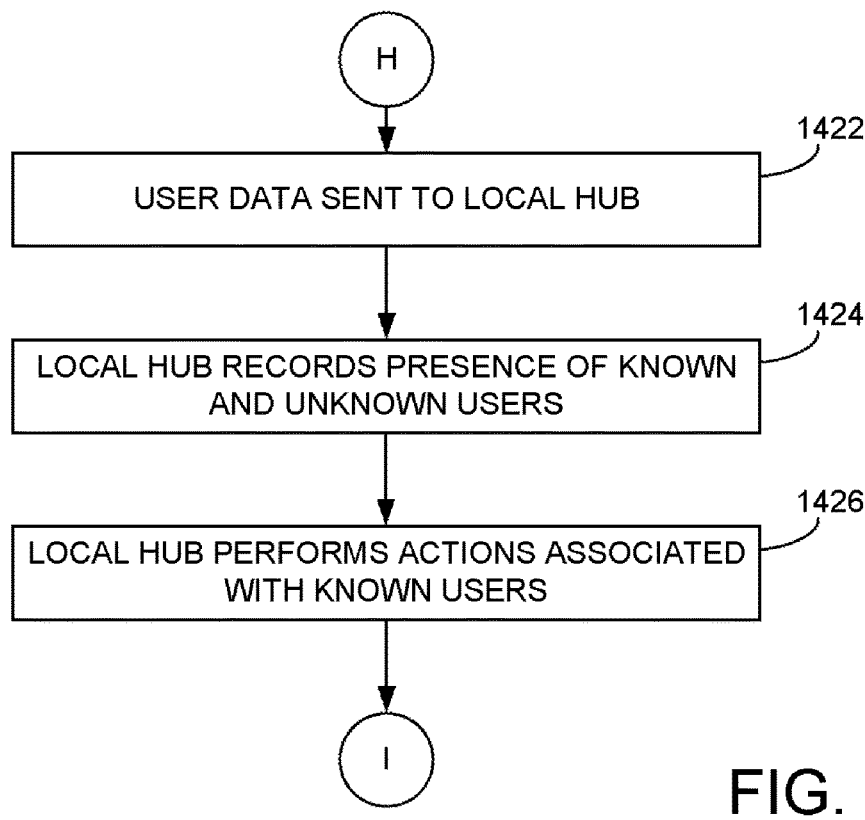

FIGS. 14A-C illustrate flow diagrams according to some embodiments that includes references to FIG. 16. In some other embodiments, a less complex method for indicating presence may be used:

1. Reader devices (e.g. 1602, 1646) outputting short-range transmissions, step 1400. In various embodiments, the transmissions may include data identifying the readers as being compatible with the security application and the cloud-based authentication system. The identifications from each reader device are typically unique. As discussed above, the communications between the reader devices (e.g. 1602, 1646) and the smart phones 1606, 1644 may occur via Bluetooth, or the like.

2. In response to these transmissions, smart devices may automatically run the security application and respond back, step 1404 to the reader devices it senses with transmissions including ephemeral IDs (e.g. 1610, 1648), step 1402. In some embodiments, the ephemeral IDs includes a MAC address of the smart device. These ephemeral IDs are not permanently associated with the smart devices, and typically identify the smart devices to the reader device. In the case where the broadcast regions of two reader devices overlap and a user's smart device receives transmissions from both reader devices, the smart device may communicate with both reader devices in an time interleaved manner; may complete communicating with one reader device before communicating with the second reader; or the like.

3. Next, in some embodiments, via the security application on the smart devices, the current ephemeral IDs (e.g. MAC address) as well as user identifying information (e.g. phone number, name, email address, or the like) (e.g. metadata 1618, 1650) is sent back to the authentication server 1600, step 1406. This communication may be via Wi-Fi, cellular network, or the like.

4. In response, the authentication server 1600 stores the association of ephemeral ID and user identifying information. Additionally, the authentication server 1600 may determine whether the users are known or have registered by matching the user identifying information to a database or the like, step 1408.

5. Next, in the reader device, the ephemeral IDs are then sent (e.g. 1652 and 1654) to a local hub 1624, step 1410. In various embodiments, reader devices (e.g. 1602 and 1646) within a location or sub-location (e.g. meeting rooms) may be networked together to a local hub 1624 via Wi-Fi, Bluetooth, ZigBee, a mesh-network or other short-range communications. In some embodiments, the hub 1624 may be another smart device (e.g. tablet computer, laptop computer, or the like).

14. In some embodiments, the local hub 1624 communicates 1656 the ephemeral IDs back to a centralized server or gateway 1662 via Wi-Fi, Bluetooth, ZigBee, a mesh-network or other short-range communications, step 1412.

15. In turn the centralized server 1662 then communicates 1664 with the authentication server 1600 and provides the ephemeral IDs, step 1414. This may happen add 1624 may not be needed and reader devices may be coupled to the centralized server 1662.

16. In response to the ephemeral IDs, the authentication server 1600 determines whether it can identify specific registered users based upon the ephemeral IDs, step 1416. When users are registered, the authentication server 1600 may return 1658 user identifying information to the centralized server 1662, step 1418, and when the user is not registered or found, the authentication server may provide an unknown user message to the centralized server 1662. In some embodiments, the user identifying information may be a user name, user e-mail address, employee identifier, badge number, or the like. In additional embodiments, the user identifying information may include more detailed data, such as user preferences (e.g. beverage, web-sites, bookmarks), tokens or authenticated credentials from third-party services (e.g. Facebook, Netflix, Google), user schedules and appointments, and the like. In various embodiments, the same communication means discussed above may be used for the return data.

In some cases where the ephemeral ID of the user device has rotated or changed since the smart device communicated with the authentication server, the smart device may be reconnected with the authentication server 1600. In particular, if the authentication server does not recognize the smart device ephemeral ID (via the centralized server and/or the local hub), the reader device may instruct the smart device to connect to the authentication server. In response, the smart device (e.g. 1606 or 1644) connects with the authentication server 1600 and provides the user's credentials (e.g. e-mail address, telephone number, etc.) and also provides the (latest) ephemeral ID. This new ephemeral ID becomes known to the authentication server. If the user is authorized, the new ephemeral ID is associated with the user's credentials, and if the user is not authorized (e.g. not registered), the new ephemeral ID is still kept in memory.

17. The data from the authentication server (e.g. user identifying information or unknown user message) may be provided 1658 and 1666 to the local hub 1624 (if used), step 1422. In some embodiments where simple user identifying information is used, e.g. user name, employee identifier, etc., additional data described above, may be determined by the centralized server 1662 or via the local hub 1624. For example, the centralized server 1662 may include the user calendar, including appointment schedule, conference room bookings, videoconference links (e.g. Zoom.us, GoToMeeting), and the like. For identified and non-identified users present in the vicinity of a reader device, the local hub 1624 records such users as being present, step 1424.

18. In some embodiments, the local hub may 1624 take any number of physical actions in response to detection of the presence of the identified users, step 1426, for example, if the sensor is in a conference room, the local hub may use a token or authenticated credentials to login to specific websites using the user credentials, the local hub may update a conference room schedule and display 1660 the schedule next to the conference room, the local hub may order refreshments for the user, the local hub may contact IT personnel for required computing hardware, or the like; if the sensor is in an elevator, the local hub may automatically select a destination floor for the user based upon the user's needs (e.g. home floor, ground floor, visiting floor, or the like); if the sensor is in a hallway leading to another region, the local hub may unlock a door, a gate, or the like, turn-on lights and HVAC controls in the region, and the like. In light of the present disclosure, it is expected that one of ordinary skill in the art will recognize other types of physical actions that are considered within the scope of embodiments of the present invention.

19. In various embodiments, as the process above repeats continually, the presence of identified users and unidentified users relative to locations of reader devices can be maintained.

Figure 15:
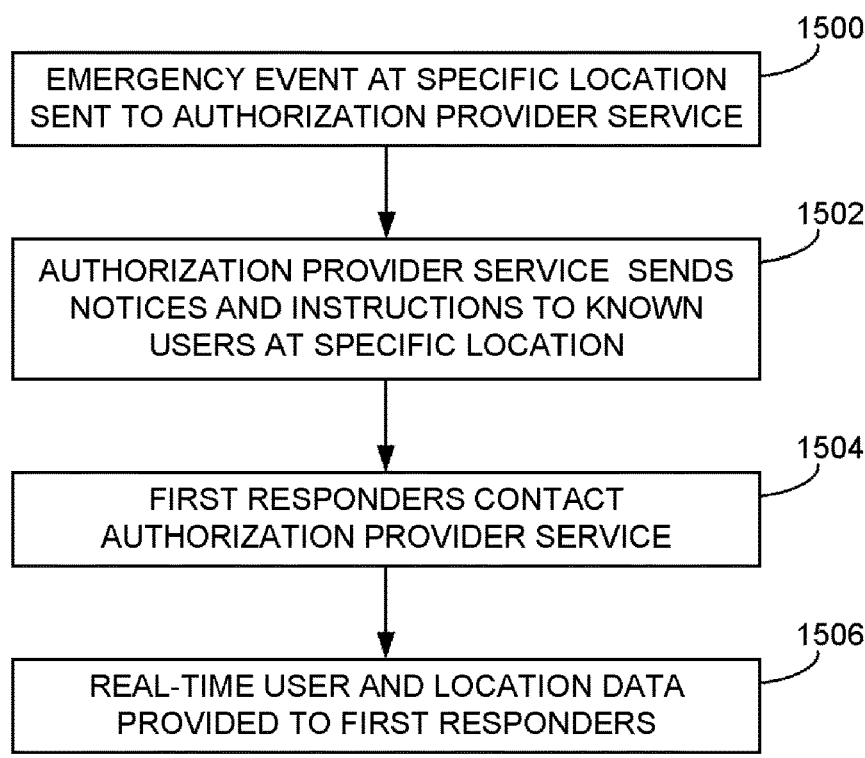
FIG. 15 is a flow diagram of a process according to various embodiments.

FIG. 15 illustrates a flow diagram according to various embodiments. In the case of an emergency event, several different ways for alerting users and first responders are contemplated. One way is via the authentication server and illustrated in FIG. 16:

1. In one embodiment, an emergency event 1638 may be sent to the authorization server 1600 from an authorized source 1636 (e.g. an administrator) indicating the location of the emergency event and the type of event, step 1500. In some cases, the emergency event may be a fire, an active shooter, earthquake, flood, riot, tornado or the like.

2. In such embodiments, when a user moves within a location, and the process above is performed, and the user's smart device (e.g. 1606) interacts with the authorization server 1600. In addition to receiving a token 1620, the user's smart device may also be given data regarding the emergency event 1640, step 1502. This data may then be used to ring or buzz the user's smart phone, and display the emergency event 1642. Depending upon the type of emergency, the user may be given express instructions. For example, in the event of a fire, the user may be given a building map with their location, and how to quickly exit the building; in the event of an active shooter; the user may be given a building map with their location and how to get to a secure room; in the event of an tornado; and the like.

3. For first responders, as described above, a high security application for a smart phone 1668, or the like may be installed, that can directly interface with the authorization server. In cases of emergency, the first responders launch the application, and identify themselves 1670 (e.g. by badge number, first responder e-mail, fingerprint, or the like), step 1504

4. After verifying the first responder's credentials, the authentication server may provide a real-time data 1672 about the location, step 1506. This data may include a building map including positions of users in the location, as determined by the presence sensors. As the users move within the building (and are sensed by different presence sensors), the display given to the first responders may be refreshed with the updated user positions.

5. In some embodiments, additional data regarding the users may be returned to the first responders' smart devices, such as the name of the user, a picture of the user, and the like. Such data may be used by the first responders to call out for and contact users. In the case where unidentified users are sensed, the first responders' may still call-out the them.

Another method for alerting users and first responders is via the centralized server 1662 associated with the location:

1. In one embodiment, an emergency event may be sent 1674 to the centralized server 1662 associated with the location, from an authorized source (e.g. an administrator) 1636 indicating the location of the emergency event and the type of event. In some embodiments, the centralized server 1662 may be associated with a specific company, a specific landlord, or the like.

2. In such embodiments, when a user moves within a location, and the process above is performed, and the user's smart device position may be detected by one or more sensors (e.g. 1602, 1646), and in turn the one or more sensors may report to a local hub 1624 and/or to the location centralized server 1662. In an emergency event, if the centralized server 1662 may provide information related to the emergency event on kiosks, local hubs (e.g. 1642), information displays, or the like. The displays may give the user may express instructions. For example, in the event of a tornado, the local hub, or the like may display a building map with the location of a secure room; in the event of a fire, the local hub may display a building map how to get to quickly exit.

In some embodiments, the centralized server 1662 may provide information related to the emergency directly upon the users' smart devices. In such cases, the reader device (e.g. 1602, 1646) includes the ability to provide data, other than simply signaling data, to the smart devices. In particular, the centralized server 1662 may provide the emergency information such as: images and text detailing the nature of the emergency, exit directions, instructions, and the like, directly to the reader devices or to the reader devices via the local hub 1624. In turn, the local hub 1624 provides such data to the smart devices within range, and the security application running upon the smart devices can display, sound out, vibrate, or the like, the emergency data to the user.

3. In some embodiments, the location centralized server 1662 may control other portions of the building facility depending upon the type of emergency. For example, in event of a fire, electronically controlled doors may be unlocked; in event of an active shooter, certain locations of a building not leading to an exit may be locked-down; and the like.

4. For first responders, as described above, a high security application for a smart phone (e.g. 1668), or the like may be installed, that can directly interface 1676 with the central server for the location. In cases of emergency, the first responders launch the application, and identify themselves (e.g. by badge number, first responder e-mail, fingerprint, or the like.)

5. After verifying the first responder's credentials, the centralized server 1662 (e.g. building server) may provide 1676 a real-time data about the location. This data may include a building map including positions of users in the location, as determined by the presence sensors and the like. As the users move within the building (and are sensed by different presence sensors), the display given to the first responders may be refreshed with the updated user positions.

6. In some embodiments, additional data regarding the users may be returned to the first responders' smart devices 1668, such as the name of the user, a picture of the user, and the like. Such data may be used by the first responders to call out for and contact users. In the case where unidentified users are sensed, the first responders' may still call-out the them.

In another embodiment systems and methods are provided for wireless identification of fixed and roaming objects. As a non-limiting example objects are discovered wirelessly. As non-limiting examples this can be achieved by using this to cover the use case of being able to create a wireless (barcode like identifier) that every device can emit to be identified, including but not limited to, the VIN of a car, a serial number of a customer electronic, and the like. This identification can then be used for situations such as auto paying for parking meters and parking and getting access to buildings, and the like. As another non-limiting example this can be used for turning people into beacons. In this manner each individual object then has its own identity beacon.

In another embodiment systems and methods are used for bi-directional communicating beacons. As a non-limiting example this can be one of a bi-directional beacon that can not only emit an advertising packet but can also scan for advertisements to query things around it for useful information or metadata that can be used to serve the subject. The limitation of beacons is that they all require a corresponding app that listening for the specific beacon to be of any use. By creating a bi-directional beacon, it can serve people that have the apps. It can also serve people who do not have the apps but detects their presence signature to serve them. This provides a self-contained beacon device similar to current beacons, that operates in both peripheral and central modes for the bi-direction natures of detection and communications.

In another embodiment systems and methods are provided for a wireless digital driver's license and verified identification. As a non-limiting example, this creates an electronic driver's license that emits as a wireless signal. Police authorities and the like can detect and instantly query the license by standing next to the first party. The first party never needs to carry a license anymore or present any info and their privacy is intact with the use of a universal ID signal. As non-limiting examples this provides how the first party enters its information into its account, how identification is verified through several methods, as well as how an associated universal ID signal provides for security to make the universal ID signal securely available to authorities through their own mobile devices.

In another embodiment systems and methods are provided for automatically paying fares on public transport. As a non-limiting example provides for, (i) automatically detecting passengers who are on a public transport vehicle, (ii) detects when they get on and off and (iii) processes payment for the fare automatically for them on the back end without the user having to do anything.

In another embodiment systems and methods are provided for secure decentralized wireless identification. As a non-limiting example this provides for the use of a first party's fingerprint, voice, appearance, and the like to verify identity to some other system without sharing the information with second party systems. In one embodiment this is achieved by using the app of the present invention on a device, including but not limited to a mobile device, as the primary validator.

A presence protocol is used to bounce the verification step between the proxy detector (fingerprint/scanner, voice/mic, appearance/camera) and the first party's proxy app such that the first party's identity and bio-info stays within the first party's control and is never shared with any central server or second party system. This provide a secure decentralized method of identification without the need to share first party information with others. This can be used for high security needs. It can also be used for additional situations including but not limited to: buying a new device and using the first party's fingerprint to log in and create an account with the device service provider without the need to fill out any form. The device instantly knows the first party name and says: "Hello first party X, I'm your new radio, how are you today?". As non-limiting examples this includes but is not limited to:

Vision—face detected and checking that its first patty X by hashing matching with the face first party X has on its device;

Voice—voice detected and checking that it's the first party by hashing its voice and checking with the proxy app to verify it is the first party;

Fingerprints; and

Other Biometrics.

All never leaving the first party's device.

In another embodiment systems and methods are provided for a universal people sensor microchip for universal sensing and identifying people interacting with a product or service.

As a non-limiting example this can include a "Universal People Sensor" as a stand-alone dedicated microchip designed to be embeddable in any consumer electronic or manufactured product to allow the product detect people that are using the product. It can also be used to extract information from the person, all without the person downloading a specific app or the device creating its own sensor. As a non-limiting example this provides a method to create the sensor, and how the sensor does what it does to identify and extract data from first parties. In one embodiment this includes how a microchip can be designed and its system and methods to behave as a universal people sensor microchip for the purposes of being something that other manufacturers can embed into their products as a plug-n-play system.

In another embodiment systems and methods are provided for wirelessly transmitting a first part's personal preference. As a non-limiting example this can include a way for any first person to beam out their references to devices around them. As a non-limiting example this includes how a first person can enter how they like their coffee in an app where a first-person account holds their personal preferences, and the app will make that information available to any coffee machine or coffee shop the first person walks into. In this embodiment collecting, organizing and beaming out a first person's personal preference are provided in a universal way, not as a locked in siloed way which is how all apps/iota devices currently do things.

In another embodiment systems and methods are provided for physical access identification using facial recognition. As a non-limiting example, a way is provided to identify a first party and grant them access based on them emitting a universal ID signal that verifies who they are to the reader as a first factor. A reader with a camera uses a camera image to match the face that the first party has in its account as a second factor. Learning algorithms can be used to better match the face every time the first party walks into a door.

In another embodiment systems and methods are provided for physical access identification of a first party using voice recognition. As a non-limiting example, a first party Is identified and then granted access based on emitting a universal ID signal that verifies who the first party is to a reader as a first factor. The reader has a microphone and requires the first party user to say "open" to match the voice pattern to that of a pre-recorded voice pattern as part of the first party signup process. The reader then matches the voice pattern that the first party has in its account as a second factor. Learning algorithms can be used to better match the voice every time the first party walks into a door.

In another embodiment systems and methods detect tailgating activities using wireless sensors and personal devices. As a non-limiting example, a method is provided to detect if a possible tailgating event has occurred by requiring all occupants to carry with them a mobile device that emits a unique universal ID signal that represents them to a reader, paired with other sensors such as thermal imaging or people counter sensors, such that the combined data allows us to count there are two proxy users. When there are three people passing through the door one is a tailgater. Several technologies can be utilized for counting people including but not limited to WIFI, ultrasound and the like. As a non-limiting example, the combination of such technologies working with the universal ID signal helps to surface tailgating events.

In another embodiment systems and methods are provided for autonomous vehicle identification of passengers for intended locking, unlocking and personalization. As a non-limiting example this provides a method that the autonomous cars use a universal ID signal to detect if they are the right passenger they are supposed to pick up without the first party having to do anything. Since cars are required to be locked in motion, autonomous cars need a way to only unlock for the right passenger on the sidewalk such that a random person doesn't jump in the car instead. The car can also use a universal ID signal to personalize the drive experience and to show a screen identifying to the passenger that this car is allocated to that first party. In this manner the problem of one car maker and one app problem is resolved by allowing all cars to use the same universal ID signal in such a way that the car software can pull in the relevant information needed to give the passenger both a personalized experience and secure/efficient pick up and open experience.

In another embodiment systems and methods are provided for machine to machine proximity payment transactions. As a non-limiting example this covers a way for independent machines to send payments to each other without requiring credit cards or a first party to intermediate. This allows for machine to machine transactions to occur. As a non-limiting example this can include: autonomous cars to pay for parking directly to a parking meter without first party involvement, e.g., it is achieved passively.

In one embodiment an inductive charging of a lock via cylindrical latch mechanism is provided. As a non-limiting example, a charge lock device is provided by an inductive coil within a latch mechanism and coils around a slot that the latch goes into to lock a door.

In one embodiment inductive charging of lock is provided via a lock faceplate and a lock device is charged by inductive coils positioned around door/frame faceplates.

In one embodiment inductive charging of phone devices is provided on a car body. As a non-limiting example, a first party's phone is charged by placing it on the bonnet of the car, for future cars that use the first party's phone as the key as a backup when the phone is dead is can still charge and allows entrance into the car.

In one embodiment any AI (assistant AI and voice command AI) can tap the universal ID signal representing the first party queries it for useful information to serve the first party.

In one embodiment a knock can be provided on the first party's phone to trigger a command to unlock a door in proximity.

In one embodiment first party phone sensors are used to fingerprint the first party such that access to a building is only granted if it's the owner of the phone. As a non-limiting example this can be applied specifically for access control and other use cases where the first party needs to be identified by its phone.

In one embodiment a first party driver with the universal ID signal and a car with a Universal ID sensor that verifies the first party can drive the car and enabled ignition and a combination of the first party, car and garage sensing gives access to the car and first party driver for secure vehicle access.

In one embodiment an organization with a fleet of cars can authorize a driver with insurance information switches over to the car and driver for the duration of the trip. This can be used as well for a rental car situation.

In one embodiment energy harvesting is achieved via weight and coil for Beacons in high vibration environments, including but not limited to buses, cars and the like.

In one embodiment energy harvesting is provided charging door devices using a hinge of a door to charge by the motion of the open and closing swinging door to charge via gears.

In one embodiment Idea a first person's universal ID signal (from a pedestrian's phone) in traffic for cars and public transport detects pedestrians and cyclists on the road. Transport/traffic systems can use it to optimize public transport and road traffic.

In one embodiment a system presence hub is plugged into a power socket in a garage that then emits a RF signal to open the garage door as the first party drives to the garage. This requires no installation and is like how a first party programs its garage relative to obtaining a new transponder.

In one embodiment an edge system is provided that includes systems and methods to enable controller-less access control for easy installation and integration into any electrified door system.

In one embodiment background a firmware OTA update system and method are provided.

In one embodiment systems and methods allow second parties to leverage a system presence system to be able to detect their beacons without needing first parties to download their own apps.

In one embodiment a bio-chip is provided that emits the universal ID signal which allows any system to detect it and use it to serve the first party in a secure and private way.

In one embodiment a universal way is provided that provides for a car to be able to give a first party a personalized experience by detecting the universal ID signal.

In one embodiment the universal ID signal allows an augmented reality system to use it to identify and provide relevant information of people augmented in the system.

In one embodiment a cached token system and methodology are provided via the universal ID signal.

In one embodiment rotating mac addresses of mobile devices to ensure a persistent signal is achieved using the universal ID signal. Such systems can use the universal ID signal without having to track and monitor the mac address, e.g., a challenge-response exchange.

In one embodiment the universal ID signal is used for logical access as a second factor auth.

In one embodiment a FPGA is used to enable the universal sensor to be universally compatible with any embedded system by programmatically enabling it to be configured to work with any interface protocol.

In one embodiment a process is provided of using a phone's magnetometer to determine directionality at an access point, i.e. entering or exiting the door.

In one embodiment each device is represented individually by a card but accessed collectively via an app container view. Each can be selected individually and be expanded to view details and send/receive commands from the associated device.

In one embodiment two BLE radios function in a way to solve for limitations of BLE not being able to connect and interact with hundreds of other devices/phones, as is illustrated in FIG. 12. As a non-limiting example one radio tracks broadcasts presence of the reader device and scans for presence of smart devices, and the other radio is used to pair the reader devices to the smart devices, individually.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A security system comprises:
    a plurality of sensor devices disposed within a location, wherein the sensor devices are configured to output presence signals to a plurality of smart devices associated with a plurality of users, wherein the sensor devices are configured to receive a plurality of ephemeral ID signals from the plurality of smart devices, wherein the plurality of ephemeral ID signals are not permanently associated with the plurality of users, wherein the sensor devices are configured to output sensor identification signals to the plurality of smart devices, wherein the sensor devices are configured to receive responsive signals from the plurality of smart devices in response to the sensor identification signals, wherein the responsive signals are not permanently associated with the plurality of smart devices, wherein the plurality of sensor devices are configured to determine a plurality of identified users and a plurality of unidentified users, if any, in response to the responsive signals;

an authentication server configured to receive the sensor identification signals and identifiers associated with the plurality of users from the plurality of smart devices, wherein the authentication server is configured to generate the responsive signals in response to the sensor identification signals and the identifiers associated with the plurality of users, wherein the authentication server is configured to provide the responsive signals, respectively, to the plurality of smart devices, and wherein the authentication server is configured to store an association between the identifiers associated with the plurality of users and the sensor devices associated with the sensor identification signals;

a hub device coupled to the plurality of sensor devices, wherein the hub device is configured to receive the plurality of ephemeral ID signals from the plurality of sensor devices, wherein the hub device is configured to obtain additional data associated with the plurality of ephemeral ID signals, and wherein the hub device is configured to provide an output display in response to the additional data associated with the plurality of ephemeral ID signals.

2. The security system of claim 1 wherein the authentication server is configured to receive an indication of an emergency event associated with the location.

3. The security system of claim 2
wherein the authentication server is configured to determine additional data associated with the emergency event;
wherein the authentication server is configured to provide the additional data associated with the emergency event to the plurality of smart devices; and
wherein the additional data associated with the emergency event is selected from a group consisting of: a location map, type of the emergency event, a route to another location, and a location of the emergency event.

4. The security system of claim 3 further comprising a smart device coupled to the authentication server, wherein the smart device is configured to display the additional data associated with the emergency event to a user associated with the smart device.

5. The security system of claim 2 wherein the authentication server is configured to output location data comprising the association between the identifiers associated with the plurality of users and the sensor devices associated with the sensor identification signals and positions of the sensor devices within the location to first-responder smart devices.

6. The security system of claim 5 further comprising a first-responder smart device coupled to the authentication server, wherein the first-responder smart device is configured to provide a visual representation of the location and the positions of the sensor devices within the location in response to the location data.

7. The security system of claim 5
wherein the authentication server is configured to determine the additional data associated with the plurality of ephemeral ID signals;
wherein the authentication server is configured to provide the additional data associated with the plurality of ephemeral ID signals to the first-responder smart devices; and
wherein the additional data associated with the plurality of ephemeral ID signals comprise data selected from a group consisting of: a user name, a picture associated with a user, an office location associated with the user.

8. The security system of claim 1 further comprising a centralized server coupled to the hub device, wherein the centralized server is configured to receive an indication of an emergency event associated with the location from the authentication server.

9. The security system of claim 8
wherein the centralized server is configured to determine additional data associated with the emergency event;
wherein the centralized server is configured to provide the additional data associated with the emergency event to the hub device; and
wherein the additional data associated with the emergency event is selected from a group consisting of: a location map, type of the emergency event, a route to another location, and a location of the emergency event.

10. The security system of claim 8
wherein the centralized server is configured to receive the plurality of ephemeral ID signals from the hub device;
wherein the centralized server is configured to provide the plurality of ephemeral ID signals to the authentication server;
wherein the centralized server is configured to receive the additional data associated with the plurality of ephemeral ID signals from the authentication server; and
wherein the centralized server is configured to provide the additional data associated with the plurality of ephemeral ID signals to the hub device.

11. The security system of claim 8 further comprising a first-responder smart device coupled to the centralized server, wherein the first-responder smart device is configured to provide a visual representation of the location and the positions of the sensor devices within the location.

12. The security system of claim 11
wherein the centralized server is configured to determine the additional data associated with the plurality of ephemeral IDs;
wherein the centralized server is configured to provide the additional data to the first-responder smart device; and
wherein the additional data comprises data selected from a group consisting of: a user name, a picture associated with a user, an office location associated with the user.

13. A method for a security system comprising:
outputting with a sensor device within a sensing region, presence signals to a plurality of smart devices associated with a plurality of users;
receiving with the sensor device, a plurality of ephemeral ID signals from the plurality of smart devices, wherein the plurality of ephemeral ID signals are not permanently associated with the plurality of users;
outputting with the sensor device, sensor identification signals to the plurality of smart devices;
receiving in an authentication server from the plurality of smart devices, the sensor identification signals and data associated with the plurality of smart devices;
determining in the authentication server, responsive signals in response to the sensing identification signals and the data;
transmitting from the authentication server to the plurality of smart devices, the responsive signals;
receiving with the sensing device, the responsive signals from the plurality of smart devices in response to the sensor identification signals, wherein the responsive signals are not permanently associated with the plurality of smart devices;

determining within the sensor device, identifiers associated with a plurality of authenticated users in response to the responsive signals;

providing from the sensor device to a hub unit coupled to a plurality of sensor devices, the identifiers associated with the plurality of authenticated users;

providing from the hub unit to a centralized server, the identifiers associated with the plurality of authenticated users;

receiving from the centralized server in the hub unit, additional data associated with the identifiers associated with the plurality of authenticated users; and displaying data on the hub unit, in response to the additional data.

14. The method of claim 13 further comprising:

receiving in the authentication server, an indication of an emergency event associated with the location;

determining in the authentication server, notification data in response to the indication of the emergency event; and providing from the authentication server to the plurality of smart devices, the notification data.

15. The method of claim 14 further comprising providing from the authentication server to a smart device associated with a first-responder, the sensor identification signals and data associated with the plurality of smart devices.

16. The method of claim 13 further comprising:

receiving in the centralized server, an indication of an emergency event associated with the location;

determining in the centralized server, notification data in response to the indication of the emergency event; and providing from the authentication server to the hub unit the notification data.

17. A security system comprises:

an authentication server configured to receive a plurality of ephemeral ID signals and a plurality of user ID signals from a plurality of smart devices associated with a plurality of users, wherein the authentication server is configured to store an association between the plurality of ephemeral ID signals with the plurality of user ID signals;

a plurality of sensor devices disposed within a location, wherein the sensor devices are configured to output presence signals to the plurality of smart devices, wherein the plurality of sensor devices are configured to receive the plurality of ephemeral ID signals from the plurality of smart devices, wherein the plurality of ephemeral ID signals are not permanently associated with the plurality of users; and a hub device coupled to the plurality of sensor devices, wherein the hub device is configured to receive the plurality of ephemeral ID signals from the plurality of sensor devices, wherein the hub device is configured to provide the plurality of ephemeral ID signals to the authentication server, wherein the hub device is configured to receive additional data associated with the plurality of ephemeral ID signals, and wherein the hub device is configured to provide an output display in response to the additional data associated with the plurality of ephemeral ID signals.

18. The security system of claim 17 further comprising:

a peripheral device coupled to the hub device, wherein the peripheral device is configured to perform a physically-perceivable action for the plurality of users under direction of the hub device; and wherein the physically-perceivable action is selected from a group consisting of: initiating a conference call, activating lights, activating HVAC controls, modifying a room reservation system, automatically selecting a destination floor, unlocking a door, unlocking a gate.

19. The security system of claim 17 wherein the additional data is selected from a group data consisting of: a user name, and a user image.

20. The security system of claim 17 wherein the authentication server is configured to receive an indication of an emergency event associated with the location;

wherein the authentication server is configured to determine additional data associated with the emergency event;

wherein the authentication server is configured to provide the additional data associated with the emergency event to the plurality of smart devices; and wherein the additional data associated with the emergency event is selected from a group consisting of: a location map, type of emergency event, a route to another location, and a location of the emergency event.

* * * * *